United States Patent
Jin et al.

(10) Patent No.: US 11,979,788 B2
(45) Date of Patent: May 7, 2024

(54) COMMUNICATION METHOD AND APPARATUS USED IN INTER-COMMUNICATIONS SYSTEM MOVE SCENARIO

(71) Applicant: HUAWEI TECHNOLOGIES CO., LTD., Shenzhen (CN)

(72) Inventors: Hui Jin, Beijing (CN); Yanzhao He, Shenzhen (CN); Fenghui Dou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 485 days.

(21) Appl. No.: 17/285,151

(22) PCT Filed: Oct. 17, 2019

(86) PCT No.: PCT/CN2019/111657
§ 371 (c)(1),
(2) Date: Apr. 14, 2021

(87) PCT Pub. No.: WO2020/078418
PCT Pub. Date: Apr. 23, 2020

(65) Prior Publication Data
US 2021/0368411 A1    Nov. 25, 2021

(30) Foreign Application Priority Data

Oct. 17, 2018 (CN) .......................... 201811208745.1
Apr. 25, 2019 (CN) .......................... 201910340568.0
May 29, 2019 (CN) .......................... 201910457353.7

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0033* (2013.01); *H04W 36/08* (2013.01); *H04W 36/165* (2013.01)

(58) Field of Classification Search
CPC ........................... H04W 92/02; H04W 84/045
(Continued)

(56) References Cited

U.S. PATENT DOCUMENTS 6,996,079 B1 * 2/2006 Bergenwall .......... H04W 36/14
370/331
2018/0227807 A1 8/2018 Youn et al.
(Continued)

FOREIGN PATENT DOCUMENTS

CN   106465080 A   2/2017
CN   108282832 A   7/2018
(Continued)

OTHER PUBLICATIONS

"3rd Generation Partnership Project; Technical Specification Group Services and System Aspects; Procedures for the 5G System; Stage 2 (Release 15)", 3GPP TS 23.502 V15.3.0 (Sep. 2018), 330 pages.
(Continued)

*Primary Examiner* — Kiet M Doan
(74) *Attorney, Agent, or Firm* — Maier & Maier, PLLC

(57) ABSTRACT

A communication method that includes: a terminal transmits data for a first application in a first communications system via a first protocol data unit (PDU) session, where the first PDU session does not support interworking between the first communications system and a second communications system. The terminal moves from the first communications system to the second communications system. After the terminal moves from the second communications system back to the first communications system, the terminal obtains a second PDU session based on at least first trans-
(Continued)

mission information of the first application, and transmits data for the first application in the first communications system via the second PDU session, where the first transmission information includes an identifier of the first application.

18 Claims, 12 Drawing Sheets

(51) Int. Cl.
*H04W 36/08* (2009.01)
*H04W 36/16* (2009.01)

(58) Field of Classification Search
USPC .................................. 370/252, 256; 455/410
See application file for complete search history.

(56) References Cited

U.S. PATENT DOCUMENTS

| | | | |
|---|---|---|---|
| 2019/0053187 A1* | 2/2019 | Tiwari | H04W 76/12 |
| 2020/0053803 A1* | 2/2020 | Youn | H04L 67/148 |
| 2020/0145953 A1* | 5/2020 | Youn | H04W 60/04 |

FOREIGN PATENT DOCUMENTS

| | | |
|---|---|---|
| CN | 108616944 A | 10/2018 |
| CN | 108617013 A | 10/2018 |
| CN | 108632917 A | 10/2018 |
| WO | 2017171189 A1 | 10/2017 |
| WO | 2018074908 A1 | 4/2018 |

OTHER PUBLICATIONS

"Discussion on UE behaviors when interworking is performed", SA WG2 Meeting #122bis, S2-175557, Huawei, Sophia Antipolis, France, Aug. 21-25, 2017; 7 pages.

"3rd Generation Partnership Project; Technical Specification Group Services and System Aspects; System Architecture for the 5G System; Stage 2 (Release 15)", 3GPP TS 23.501 V15.3.0 (Sep. 2018); 226 pages.

"3rd Generation Partnership Project; Technical Specification Group Services and System Aspects; Policy and Charging Control Framework for the 5G System; Stage 2 (Release 15)", 3GPP TS 23.503 V15.3.0 (Sep. 2018); 70 pages.

* cited by examiner

COMMUNICATION METHOD AND APPARATUS USED IN INTER-COMMUNICATIONS SYSTEM MOVE SCENARIO

CROSS-REFERENCE TO RELATED APPLICATIONS

This application is a national stage of International Application No. PCT/CN2019/111657, filed on Oct. 17, 2019, which claims priority to Chinese Patent Application No. 201910457353.7, filed on May 29, 2019, Chinese Patent Application No. 201910340568.0, filed on Apr. 25, 2019 and Chinese Patent Application No. 201811208745.1, filed on Oct. 17, 2018. All of the aforementioned patent applications are hereby incorporated by reference in their entireties.

TECHNICAL FIELD

The embodiments relate to the field of communications technologies, and in particular, to a communication method and an apparatus used in a scenario of move between different communications systems.

BACKGROUND

With rapid development of communications technologies, various terminals such as a smartphone, a tablet computer, and a portable device emerge. These terminals may support mobile communications networks of different generations at the same time and may be handed over between the mobile communications networks of different generations. A fifth generation (5G) mobile communications technology is an extension of a fourth generation (4G) mobile communications technology, and has features such as high performance, a low latency, and a high capacity. A data transmission speed of the 5G mobile communications technology may reach dozens of Gbps at maximum. That is, the data transmission speed of a 5G network is 1000 times faster than that of an existing 4G network. Therefore, when a terminal is in the 4G network and supports the 5G network, the terminal may be handed over from the 4G network to the 5G network, to achieve a higher data transmission speed.

Because quality of service (QoS) systems of the 5G network and the 4G network differ greatly, when the terminal establishes a protocol data unit (PDU) session in the 5G network, the PDU session of the terminal in the 5G network can support interworking when a network side entity sends, to the terminal, parameter information of a public data network (PDN) connection of the 4G network corresponding to parameter information of the PDU session. Interworking means that the terminal can move between the 5G network and the 4G network without changing an internet protocol address (IP address). Similarly, when the terminal establishes a PDN connection in the 4G network, a network side entity needs to send, to the terminal, parameter information of a PDU session in the 5G network corresponding to the PDN connection, so that the PDN connection can support interworking.

In other words, not all PDU sessions in the 5G network support interworking. For an application for which data is transmitted in the 5G network via a PDU session that does not support interworking, when the terminal moves between the 5G network and the 4G network, data transmission quality of the application may be affected.

SUMMARY

The embodiments provide a communication method and an apparatus used in a scenario of moving between different communications systems, so that when a terminal moves between different communications systems, quality of data transmission of an application running on the terminal can be improved.

According to a first aspect, a communication method used in a scenario of moving between different communications systems is provided and includes: a terminal transmits data for a first application in a first communications system via a first protocol data unit PDU session, where the first PDU session does not support interworking between the first communications system and a second communications system. The terminal moves from the first communications system to the second communications system. After the terminal moves from the second communications system back to the first communications system, the terminal obtains a second PDU session based on at least first transmission information of the first application, and transmits data for the first application in the first communications system via the second PDU session, where the first transmission information includes an identifier of the first application.

Optionally, the first communications system is a 5G communications system, and the second communications system is a 4G communications system.

In this solution, for the first application that is in the terminal and for which the terminal transmits data via the first PDU session that does not support interworking between the first communications system and the second communications system, when the terminal moves from the first communications system to the second communications system and then moves from the second communications system back to the first communications system, in an embodiment, the terminal transmits data for the first application via the second PDU session based on the first transmission information of the first application. The first transmission information includes at least the identifier of the first application, and the terminal may ensure that the second PDU session can meet a data transmission quality requirement of the first application. Therefore, data transmission quality of the first application can be ensured when the terminal moves from the first communications system to the second communications system and then moves from the second communications system back to the first communications system. That is, a prior-art problem that when the terminal moves from the first communications system to the second communications system and then moves from the second communications system back to the first communications system, data transmission quality of the first application deteriorates because the terminal transmits data for the first application via a default PDU session and the default PDU session cannot meet the data transmission quality requirement of the first application is resolved.

With reference to the first aspect, in a possible implementation of the first aspect, the first transmission information further includes a context of the first PDU session, and that the terminal obtains a second PDU session based on at least first transmission information of the first application includes: the terminal establishes the second PDU session in the first communications system based on the context of the first PDU session.

In this solution, the second PDU session used to transmit data for the first application is established based on the context of the first PDU session previously used to transmit data for the first application, so that the second PDU session is established efficiently.

With reference to the first aspect, in a possible implementation of the first aspect, that the terminal obtains a second PDU session based on at least first transmission information of the first application includes: the terminal obtains, based on the identifier of the first application, parameter information used to establish a PDU session corresponding to the first application; and the terminal establishes the second PDU session in the first communications system based on the parameter information used to establish the PDU session corresponding to the first application.

In this solution, the terminal does not need to store the context of the first PDU session, to save memory of the terminal.

With reference to the first aspect, in a possible implementation of the first aspect, that the terminal obtains a second PDU session based on at least first transmission information of the first application includes: the terminal obtains, based on the identifier of the first application, parameter information used to establish a PDU session corresponding to the first application; and if the terminal has no third PDU session in the first communications system, and parameter information in a context of the third PDU session includes at least some of the parameter information used to establish the PDU session corresponding to the first application, the terminal establishes the second PDU session in the first communications system based on the parameter information used to establish the PDU session corresponding to the first application; or if the terminal has the third PDU session in the first communications system, the third PDU session is the second PDU session.

In this solution, because the parameter information in the context of the third PDU session includes at least some of the parameter information used to establish the PDU session corresponding to the first application, the third PDU session matches data transmission of the first application. Therefore, if the terminal has the third PDU session in the first communications system, there is no need to reestablish a PDU session for transmitting data for the first application, and data transmission quality of the first application can be ensured by using the third PDU session, to reduce power consumption of the terminal. If the terminal has no third PDU session in the first communications system, the terminal establishes the second PDU session in the first communications system based on the parameter information used to establish the PDU session corresponding to the first application, to ensure data transmission quality of the first application.

With reference to the first aspect, in a possible implementation of the first aspect, if the terminal starts a second application in the second communications system, and a PDN connection that is used to transmit data for the second application in the second communications system does not support interworking between the first communications system and the second communications system, after the terminal moves from the second communications system back to the first communications system, the method further includes: the terminal obtains, based on an identifier of the second application, parameter information used to establish a PDU session corresponding to the second application; and if the terminal has no fourth PDU session in the first communications system, and parameter information in a context of the fourth PDU session includes at least some of the parameter information used to establish the PDU session corresponding to the second application, the terminal establishes a fifth PDU session in the first communications system based on the parameter information used to establish the PDU session corresponding to the second application, and transmits data for the second application via the fifth PDU session; or if the terminal has the fourth PDU session in the first communications system, the terminal transmits data for the second application in the first communications system via the fourth PDU session.

In this solution, in a scenario in which the terminal moves from the second communications system to the first communications system, if the second application is started in the second communications system, and the PDN connection that is used to transmit data for the second application does not support interworking between the first communications system and the second communications system, in this solution, the terminal determines, based on the identifier of the second application, the PDU session that is used to transmit data for the second application in the first communications system, and the terminal can ensure that a determined PDU session that is used to transmit data for the first application can meet the data transmission quality requirement of the second application, to ensure data transmission quality of the second application when the terminal moves from the second communications system to the first communications system.

With reference to the first aspect, in a possible implementation of the first aspect, the first transmission information further includes a data network name (DNN) used by the first PDU session, and after the terminal moves from the first communications system to the second communications system, the method further includes: when a target PDN connection exists in the second communications system, the terminal transmits data for the first PDU session in the second communications system via the target PDN connection, where the target PDN connection is a PDN connection that uses a target access point name (APN), and the target APN is an APN that is in the second communications system and that is corresponding to the DNN used by the first PDU session.

In this solution, for the first application for which data is transmitted in the first communications system via the first PDU session that does not support interworking between the first communications system and the second communications system, when the terminal moves from the first communications system to the second communications system, in an embodiment, a PDN connection used to transmit data for this application in the second communications system is obtained based on the context of the first PDU session in the transmission information of the first application, so that data can still be transmitted for the first application in the second communications system. This ensures normal running of the first application when the terminal moves between different communications systems.

With reference to the first aspect, in a possible implementation of the first aspect, the first transmission information includes the context of the first PDU session, and after the terminal moves from the first communications system to the second communications system, the method further includes: the terminal establishes a first PDN connection in the second communications system based on the context of the first PDU session; and the terminal transmits data for the first PDU session in the second communications system via the first PDN connection. The context of the first PDU session includes a DNN used by the first PDU session; and before the terminal establishes the first PDN connection in the second communications system based on the context of the first PDU session, the method further includes: the terminal determines that no PDN connection that uses a target access point name APN exists in the second communications system, where the target APN is an APN that is in the second communications system and that is corresponding to the DNN used by the first PDU session.

In this solution, for the first application for which data is transmitted in the first communications system via the first PDU session that does not support interworking between the first communications system and the second communications system, when the terminal moves from the first communications system to the second communications system, in an embodiment, a PDN connection used to transmit data for this application in the second communications system is established based on the context of the first PDU session in the transmission information of the first application, so that data can still be transmitted for the first application in the second communications system. This ensures normal running of the first application when the terminal moves between different communications systems.

With reference to the first aspect, in a possible implementation of the first aspect, the method further includes: the terminal stores the first transmission information when the first PDU session does not support interworking between the first communications system and the second communications system.

In this solution, the first transmission information is stored, so that after the terminal moves from the first communications system to the second communications system and then moves from the second communications system back to the first communications system, the terminal can redetermine, for the first application, a PDU session that can ensure data transmission quality of the first application.

With reference to the first aspect, in a possible implementation of the first aspect, the first transmission information includes the context of the first PDU session.

This solution can improve efficiency of reestablishing a PDU session for the first application when the terminal moves from the first communications system to the second communications system and then moves from the second communications system back to the first communications system.

According to a second aspect, the embodiments provide a communication method used in a scenario of move between different communications systems, and the communication method includes: a terminal transmits data for a first application in a 4G communications system via a first PDN connection, where the first PDN connection does not support interworking between the 4G communications system and a 5G communications system. After the terminal moves from the 4G communications system to the 5G communications system, the terminal obtains a first PDU session based on at least first transmission information of the first application, and transmits data for the first application in the 5G communications system via the first PDU session, where the first transmission information includes an identifier of the first application.

In this solution, in a scenario in which the terminal moves from a second communications system to a first communications system, if the first application is started in the second communications system, and the PDN connection that is used to transmit data for the first application does not support interworking between the first communications system and the second communications system, the terminal transmits data for the first application via the first PDU session based on the first transmission information of the first application. The first transmission information of the first application includes the identifier of the first application, and the determined first PDU session can meet a data transmission quality requirement of the first application. Therefore, data transmission quality of the first application is ensured when the terminal moves from the second communications system to the first communications system. That is, a prior-art problem that when the terminal moves from the first communications system to the second communications system and then moves from the second communications system back to the first communications system, data transmission quality of the first application deteriorates because the terminal transmits data for the first application via a default PDU session and the default PDU session cannot meet the data transmission quality requirement of the first application is resolved.

With reference to the second aspect, in a possible implementation of the second aspect, that the terminal obtains a first PDU session based on at least first transmission information of the first application includes: the terminal obtains, based on the identifier of the first application, parameter information used to establish a PDU session corresponding to the first application; and the terminal establishes the first PDU session in the 5G communications system based on the parameter information used to establish the PDU session corresponding to the first application.

This solution provides an implementation in which the terminal obtains, based on the identifier of the first application, the PDU session that can meet the data transmission quality requirement of the first application.

With reference to the second aspect, in a possible implementation of the second aspect, that the terminal obtains a first PDU session based on at least first transmission information of the first application includes: the terminal obtains, based on the identifier of the first application, parameter information used to establish a PDU session corresponding to the first application; and if the terminal has no second PDU session in the 5G communications system, and parameter information in a context of the second PDU session includes at least some of the parameter information used to establish the PDU session corresponding to the first application, the terminal establishes the first PDU session in the 5G communications system based on the parameter information used to establish the PDU session corresponding to the first application; or if the terminal has the second PDU session in the 5G communications system, the second PDU session is the first PDU session.

This solution provides another implementation in which the terminal obtains, based on the identifier of the first application, the PDU session that can meet the data transmission quality requirement of the first application. This solution can reduce power consumption of the terminal.

With reference to the second aspect, in a possible implementation of the second aspect, the method further includes: the terminal stores the first transmission information when the first PDN connection does not support interworking between the first communications system and the second communications system.

In this solution, the first transmission information is stored, so that after the terminal moves from the second communications system to the first communications system, the terminal can determine, for the first application, a PDU session that can ensure data transmission quality of the first application.

According to a third aspect, the application embodiments provide an apparatus used in a scenario of moving between different communications systems, and the apparatus includes: a first processing module, configured to transmit data for a first application in a first communications system via a first PDU session, where the first PDU session does not support interworking between the first communications system and a second communications system; and a second processing module, configured to move, by the apparatus, from the first communications system to the second communications system. After the apparatus moves from the second communications system back to the first communications system, the second processing module and/or the first processing module are/is configured to obtain a second PDU session based on at least first transmission information of the first application, where the first transmission information includes an identifier of the first application. The first processing module is further configured to transmit data for the first application in the first communications system via the second PDU session.

With reference to the third aspect, in a possible implementation of the third aspect, the first transmission information further includes a context of the first PDU session, and that the second processing module is configured to obtain a second PDU session based on at least first transmission information of the first application includes: the second processing module is configured to establish the second PDU session based on the context of the first PDU session.

With reference to the third aspect, in a possible implementation of the third aspect, that the second processing module and the first processing module are configured to obtain a second PDU session based on at least first transmission information of the first application includes: the first processing module is configured to obtain, based on the identifier of the first application, parameter information used to establish a PDU session corresponding to the first application; and the second processing module is configured to establish the second PDU session based on the parameter information used to establish the PDU session corresponding to the first application.

With reference to the third aspect, in a possible implementation of the third aspect, that the second processing module and the first processing module are configured to obtain a second PDU session based on at least first transmission information of the first application includes: the first processing module is configured to obtain, based on the identifier of the first application, parameter information used to establish a PDU session corresponding to the first application; and if the apparatus has no third PDU session in the first communications system, and parameter information in a context of the third PDU session includes at least some of the parameter information used to establish the PDU session corresponding to the first application, the second processing module is configured to establish the second PDU session in the first communications system based on the parameter information used to establish the PDU session corresponding to the first application; or if the apparatus has the third PDU session in the first communications system, the third PDU session is the second PDU session.

With reference to the third aspect, in a possible implementation of the third aspect, the apparatus further includes the second processing module. If the apparatus starts a second application in the second communications system, and a PDN connection that is used to transmit data for the second application in the second communications system does not support interworking between the first communications system and the second communications system, after the apparatus moves from the second communications system back to the first communications system, the first processing module is further configured to obtain, based on an identifier of the second application, parameter information used to establish a PDU session corresponding to the second application; and if the apparatus has no fourth PDU session in the first communications system, and parameter information in a context of the fourth PDU session includes at least some of the parameter information used to establish the PDU session corresponding to the second application, the second processing module is further configured to establish a fifth PDU session in the first communications system based on the parameter information used to establish the PDU session corresponding to the second application, and the first processing module is further configured to transmit data for the second application via the fifth PDU session; or if the apparatus has the fourth PDU session in the first communications system, the first processing module is further configured to transmit data for the second application in the first communications system via the fourth PDU session.

With reference to the third aspect, in a possible implementation of the third aspect, the first transmission information further includes a DNN used by the first PDU session, and after the apparatus moves from the first communications system to the second communications system, when the apparatus has a target PDN connection in the second communications system, the first processing module is further configured to transmit data for the first PDU session in the second communications system via the target PDN connection, where the target PDN connection is a PDN connection that uses a target APN, and the target APN is an APN that is in the second communications system and that is corresponding to the DNN used by the first PDU session.

With reference to the third aspect, in a possible implementation of the third aspect, the first transmission information includes the context of the first PDU session, and after the apparatus moves from the first communications system to the second communications system, the second processing module is further configured to establish a first PDN connection in the second communications system based on the context of the first PDU session; and the first processing module is further configured to transmit data for the first PDU session in the second communications system via the first PDN connection.

With reference to the third aspect, in a possible implementation of the third aspect, the context of the first PDU session includes a DNN used by the first PDU session; and before the second processing module is configured to establish the first PDN connection in the second communications system based on the context of the first PDU session, the first processing module is further configured to determine that the apparatus has no PDN connection that uses a target APN in the second communications system, where the target APN is an APN that is in the second communications system and that is corresponding to the DNN used by the first PDU session.

With reference to the third aspect, in a possible implementation of the third aspect, the first processing module is further configured to store the first transmission information when the first PDU session does not support interworking between the first communications system and the second communications system.

With reference to the third aspect, in a possible implementation of the third aspect, the first transmission information includes the context of the first PDU session.

With reference to the third aspect, in a possible implementation of the third aspect, the first communications system is a 5G communications system, and the second communications system is a 4G communications system.

According to a fourth aspect, the embodiments provide an apparatus used in a scenario of move between different communications systems, and the apparatus includes: a first processing module, configured to transmit data for a first application in a 4G communications system via a first PDN connection, where the first PDN connection does not support interworking between the 4G communications system and a 5G communications system. After the apparatus moves from the 4G communications system to the 5G communications system, the first processing module and/or a second processing module are/is configured to obtain a first PDU session based on at least first transmission information of the first application; and the first processing module is further configured to transmit data for the first application in the 5G communications system via the first PDU session, where the first transmission information includes an identifier of the first application.

With reference to the fourth aspect, in a possible implementation of the fourth aspect, that the first processing module and a second processing module are configured to obtain a first PDU session based on at least first transmission information of the first application includes: the first processing module is configured to obtain, based on the identifier of the first application, parameter information used to establish a PDU session corresponding to the first application; and the second processing module is configured to establish the first PDU session in the 5G communications system based on the parameter information used to establish the PDU session corresponding to the first application.

With reference to the fourth aspect, in a possible implementation of the fourth aspect, that the first processing module and a second processing module are configured to obtain a first PDU session based on at least first transmission information of the first application includes: the first processing module is configured to obtain, based on the identifier of the first application, parameter information used to establish a PDU session corresponding to the first application; and if the apparatus has no second PDU session in the 5G communications system, and parameter information in a context of the second PDU session includes at least some of the parameter information used to establish the PDU session corresponding to the first application, the second processing module is configured to establish the first PDU session in the 5G communications system based on the parameter information used to establish the PDU session corresponding to the first application; or if the apparatus has the second PDU session in the 5G communications system, the second PDU session is the first PDU session.

With reference to the fourth aspect, in a possible implementation of the fourth aspect, the first processing module is further configured to store the first transmission information when the first PDN connection does not support interworking between the first communications system and the second communications system.

According to a fifth aspect, an embodiment provides an apparatus used in a scenario of moving between different communications systems, and the apparatus includes: an application processor, configured to transmit data for a first application in a first communications system via a first PDU session, where the first PDU session does not support interworking between the first communications system and a second communications system; and a modem, configured to move, by the apparatus, from the first communications system to the second communications system. After the apparatus moves from the second communications system back to the first communications system, the modem and/or the application processor are/is configured to obtain a second PDU session based on at least first transmission information of the first application, where the first transmission information includes an identifier of the first application; and the application processor is further configured to transmit data for the first application in the first communications system via the second PDU session.

With reference to the fifth aspect, in a possible implementation of the fifth aspect, the first transmission information further includes a context of the first PDU session, and that the modem is configured to obtain a second PDU session based on at least first transmission information of the first application includes: the modem is configured to establish the second PDU session based on the context of the first PDU session.

With reference to the fifth aspect, in a possible implementation of the fifth aspect, that the modem and the application processor are configured to obtain a second PDU session based on at least first transmission information of the first application includes: the application processor is configured to obtain, based on the identifier of the first application, parameter information used to establish a PDU session corresponding to the first application; and the modem is configured to establish the second PDU session based on the parameter information used to establish the PDU session corresponding to the first application.

With reference to the fifth aspect, in a possible implementation of the fifth aspect, that the modem and the application processor are configured to obtain a second PDU session based on at least first transmission information of the first application includes: the application processor is configured to obtain, based on the identifier of the first application, parameter information used to establish a PDU session corresponding to the first application; and if the apparatus has no third PDU session in the first communications system, and parameter information in a context of the third PDU session includes at least some of the parameter information used to establish the PDU session corresponding to the first application, the modem is configured to establish the second PDU session in the first communications system based on the parameter information used to establish the PDU session corresponding to the first application; or if the apparatus has the third PDU session in the first communications system, the third PDU session is the second PDU session.

With reference to the fifth aspect, in a possible implementation of the fifth aspect, if the apparatus starts a second application in the second communications system, and a PDN connection that is used to transmit data for the second application in the second communications system does not support interworking between the first communications system and the second communications system, after the apparatus moves from the second communications system back to the first communications system, the application processor is further configured to obtain, based on an identifier of the second application, parameter information used to establish a PDU session corresponding to the second application; and if the apparatus has no fourth PDU session in the first communications system, and parameter information in a context of the fourth PDU session includes at least some of the parameter information used to establish the PDU session corresponding to the second application, the modem is configured to establish a fifth PDU session in the first communications system based on the parameter information used to establish the PDU session corresponding to the second application, and the application processor is further configured to transmit data for the second application via the fifth PDU session; or if the apparatus has the fourth PDU session in the first communications system, the application processor is further configured to transmit data for the second application in the first communications system via the fourth PDU session.

With reference to the fifth aspect, in a possible implementation of the fifth aspect, the first transmission information further includes a DNN used by the first PDU session, and after the apparatus moves from the first communications system to the second communications system, when the apparatus has a target PDN connection in the second communications system, the application processor is further configured to transmit data for the first PDU session in the second communications system via the target PDN connection, where the target PDN connection is a PDN connection that uses a target APN, and the target APN is an APN that is in the second communications system and that is corresponding to the DNN used by the first PDU session.

With reference to the fifth aspect, in a possible implementation of the fifth aspect, the first transmission information includes the context of the first PDU session, and after the apparatus moves from the first communications system to the second communications system, the modem is configured to establish a first PDN connection in the second communications system based on the context of the first PDU session; and the application processor is further configured to transmit data for the first PDU session in the second communications system via the first PDN connection.

With reference to the fifth aspect, in a possible implementation of the fifth aspect, the context of the first PDU session includes a DNN used by the first PDU session; and before the modem is configured to establish the first PDN connection in the second communications system based on the context of the first PDU session, the application processor is further configured to determine that the apparatus has no PDN connection that uses a target APN in the second communications system, where the target APN is an APN that is in the second communications system and that is corresponding to the DNN used by the first PDU session.

With reference to the fifth aspect, in a possible implementation of the fifth aspect, the application processor is further configured to store the first transmission information when the first PDU session does not support interworking between the first communications system and the second communications system.

With reference to the fifth aspect, in a possible implementation of the fifth aspect, the first transmission information includes the context of the first PDU session.

With reference to the fifth aspect, in a possible implementation of the fifth aspect, the first communications system is a 5G communications system, and the second communications system is a 4G communications system.

According to a sixth aspect, an embodiment provides an apparatus used in a scenario of moving between different communications systems is provided, and the apparatus includes: an application processor, configured to transmit data for a first application in a 4G communications system via a first PDN connection, where the first PDN connection does not support interworking between the 4G communications system and a 5G communications system. After the apparatus moves from the 4G communications system to the 5G communications system, the application processor and/or a modem are/is configured to obtain a first PDU session based on at least first transmission information of the first application. The application processor is further configured to transmit data for the first application in the 5G communications system via the first PDU session, where the first transmission information includes an identifier of the first application.

With reference to the sixth aspect, in a possible implementation of the sixth aspect, that the application processor and a modem are configured to obtain a first PDU session based on at least first transmission information of the first application includes: the application processor is configured to obtain, based on the identifier of the first application, parameter information used to establish a PDU session corresponding to the first application; and the modem is configured to establish the first PDU session in the 5G communications system based on the parameter information used to establish the PDU session corresponding to the first application.

With reference to the sixth aspect, in a possible implementation of the sixth aspect, that the application processor and a modem are configured to obtain a first PDU session based on at least first transmission information of the first application includes: the application processor is configured to obtain, based on the identifier of the first application, parameter information used to establish a PDU session corresponding to the first application; and if the apparatus has no second PDU session in the 5G communications system, and parameter information in a context of the second PDU session includes at least some of the parameter information used to establish the PDU session corresponding to the first application, the modem is configured to establish the first PDU session in the 5G communications system based on the parameter information used to establish the PDU session corresponding to the first application; or if the apparatus has the second PDU session in the 5G communications system, the second PDU session is the first PDU session.

With reference to the sixth aspect, in a possible implementation of the sixth aspect, the application processor is further configured to store the first transmission information when the first PDN connection does not support interworking between the first communications system and the second communications system.

According to a seventh aspect, an embodiment provides an apparatus used in a scenario of moving between different communications systems. The terminal includes a processor and a memory, the memory stores an instruction, and when the instruction is run by the processor, the apparatus is enabled to perform the method according to any one of the first aspect and the possible implementations of the first aspect or the method according to any one of the second aspect and the possible implementations of the second aspect.

According to an eighth aspect, an embodiment provides a readable storage medium. The readable storage medium stores a computer program. When the computer program is executed, the method according to any one of the first aspect and the possible implementations of the first aspect or the method according to any one of the second aspect and the possible implementations of the second aspect is implemented.

In some embodiments, for the application that is in the terminal and for which the terminal transmits data via the first PDU session that does not support interworking between the first communications system and the second communications system, when the terminal moves from the first communications system to the second communications system and then moves from the second communications system back to the first communications system, in some embodiments, the terminal determines the second PDU session based on the first transmission information of the application, and transmits data for the application via the second PDU session. The first transmission information includes at least the identifier of the application, and the terminal may ensure that the determined second PDU session can meet a data transmission quality requirement of the application. Therefore, data transmission quality of the application can be ensured when the terminal moves from the first communications system to the second communications system and then moves from the second communications system back to the first communications system. That is, a problem that when the terminal moves from the first communications system to the second communications system and then moves from the second communications system back to the first communications system, data transmission quality of the application deteriorates because the terminal transmits data for the application via a default PDU session and the default PDU session cannot meet the data transmission quality requirement of the application is resolved.

DETAILED DESCRIPTION OF THE EMBODIMENTS

Figure 1:
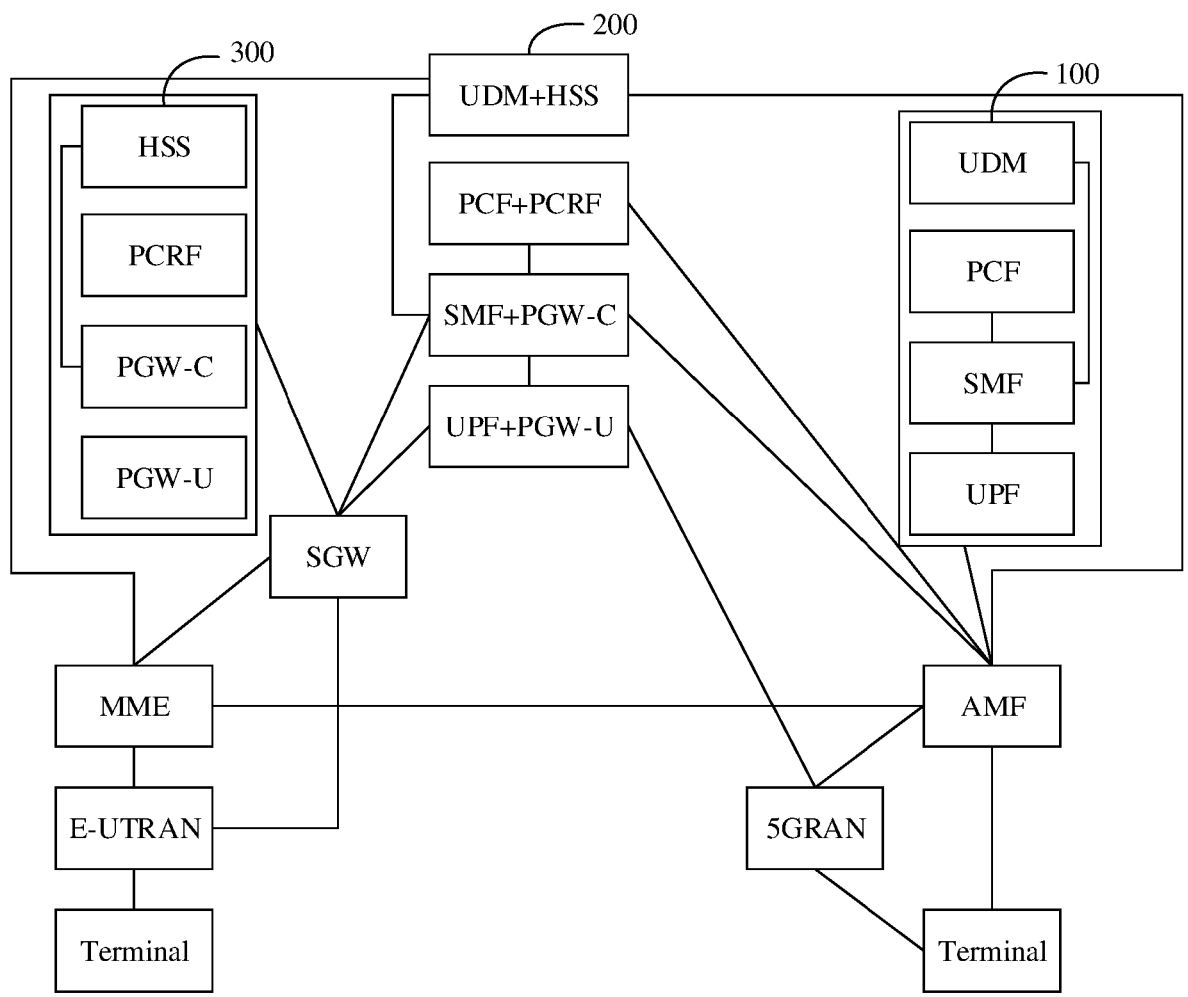
FIG. 1 is a schematic diagram of a system architecture according to an embodiment.

Currently, a terminal device may support mobile communications networks of different generations at the same time and may be handed over between the mobile communications networks of different generations. When performance such as a data transmission speed of a first communications system is better than that of a second communications system, and the terminal is in the second communications system and supports communication in the first communications system, the terminal may be handed over from the second communications system to the first communications system, to achieve a higher data transmission speed. In addition, in some scenarios, the terminal may also be handed over from the second communications system to the first communications system. That is, the terminal may move between the second communications system and the first communications system.

For example, a terminal of a user is currently in the first communications system, the user is using an application a installed on the terminal device, and a PDU session a used to transmit data for the application a in the first communications system does not support interworking. In a process in which the user uses the application a, the terminal moves from the first communications system to the second communications system and then moves from the second communications system back to the second communications system for some reason (for example, the terminal enters an area in which the first communications system is not supported and then enters an area in which the first communications system is supported), and the original PDU session a has been released. The terminal transmits data for the application a via a default PDU session b. However, the PDU session b may be unable to meet a data transmission quality requirement of the application a. Consequently, data transmission quality of the application a deteriorates. For example, the application a cannot run smoothly, freezing may even occur. The embodiments provide a communication method used in a scenario of move between different communications systems. The embodiments can resolve the foregoing problem.

Before the embodiments are described, the terms in the embodiments are described first.

A PDN connection is a combination of a group of evolved packet system (EPS) bearers established for a terminal in a second communications system (for example, a 4G communications system). These EPS bearers have a same IP address and a same APN. On a terminal side and a network side, a PDN connection is identified by an IP address and an APN.

A context of a PDN connection may include one or more of the following information: an IP address, an APN, and a PDN gateway (PGW) address used by the PDN connection, and context information of each EPS bearer.

An EPS bearer is a data transmission channel in a 4G communications system. An active EPS bearer is an established data transmission channel with specific QoS in the 4G communications system. An inactive EPS bearer is a data transmission channel that has been deleted from a first communications system.

A PDU session is a combination of a group of QoS flows established for a terminal in a first communications system (for example, a 5G communications system), and these QoS flows have a same IP address and a same DNN. On a terminal side and a network side, a PDU session is identified by an IP address and a DNN.

A context of a PDU session may include an IP address, a DNN, an SMF, and a UPF address that are used by the PDU session, and context information of each QoS flow.

A service and session continuity (SSC) mode of a PDU session: there is a description on continuity of each PDU session in a first communications system (for example, 5G). An SSC mode 1 indicates that PDU sessions can always be continuous in a moving process of a terminal. An SSC mode 2 indicates that in a moving process, the terminal may first release an existing PDU session, and establish a new PDU session to replace the released PDU session. An SSC mode 3 indicates that in a moving process, the terminal may continue to maintain an existing PDU session for a period of time and establish a new PDU session to replace the existing PDU session. After the existing PDU session expires, the existing PDU session is released, and only the new PDU session is retained.

QoS flow information includes a combination of one or more pieces of information of QoS information, a QoS flow identity (QFI), and a QoS flow template of the QoS flow. For example, in a 5G communications system, the QoS information may further include a combination of one or more pieces of information of a 5G QoS indicator (5QI), an allocation and retention priority (ARP), a guaranteed flow bit rate (GFBR), a maximum flow bit rate (MFBR), and notification control that are corresponding to the QoS. The QoS flow information is used to describe the QoS flow, and may include, but is not limited to, the previously described information. The QoS flow information may alternatively be referred to as a QoS parameter, and the QoS flow information in the embodiments may be replaced with the QoS parameter.

FIG. 1 shows a system architecture of a communications system to which the embodiments may be applied. The system architecture includes a first communications system and a second communications system. In FIG. 1, for example, the first communications system is a 5G communications system, and the second communications system is a 4G communications system.

Referring to FIG. 1, the communications system includes a terminal, an evolved UMTS terrestrial radio access network (E-UTRAN), a mobility management entity (MME), a serving gateway (SGW), an access and mobility management function (AMF), and a 5G radio access network (5G-RAN), core network devices 100 in the first communications system, core network devices 300 in the second communications system, and core network devices 200 deployed in both the first communications system and the second communications system. It may be understood that the MME and the AMF are also core network devices. For clarity of illustration, a connection relationship between the AMF and the core network devices 100 in the first communications system is not shown, and the connection relationship is the same as a connection relationship between the AMF and the core network devices 200 deployed in both the first communications system and the second communications system. For clarity of illustration, a connection relationship between the SGW and the core network devices 300 in the second communications system is not shown, and the connection relationship is the same as a connection relationship between the SGW and the core network devices 200 deployed in both the first communications system and the second communications system.

The E-UTRAN is a 4G-side base station, and the terminal may access the 4G communications system through the base station. The 5G-RAN is a 5G-side base station, the terminal may access the 5G communications system through the base station, and the 5G-RAN is a base station that is obtained after the E-UTRAN is further evolved and through which the terminal can access the 5G communications system, or the 5G-RAN may be a base station through which the terminal dedicatedly accesses the 5G communications system.

The MME is a 4G core network device and is responsible for terminal authentication, authorization, mobility management, and session management. A linked EPS bearer identity (LBI) of a PDN connection of the terminal in the 4G network is allocated by the entity. The SGW is a 4G core network device and is responsible for data forwarding, downlink data storage, and the like.

The AMF is a 5G core network device and is used to authenticate and authorize a user and manage mobility of the user.

The core network devices 200 deployed in both the first communications system and the second communications system include: a user plane function (UPF)+PDN gateway-user plane (PGW-U), a session management function (SMF)+PDN gateway-control plane (PGW-C), a policy control function (PCF)+policy and charging rules function (PCRF), and a home subscriber server (HSS)+unified data management (UDM).

The UPF+PGW-U is a core network device shared by 4G and 5G, namely, a core network device deployed in both 4G and 5G, and includes functions of a UPF and a PGW-U. The UPF is a user plane device of a 5G core network, provides a user plane service for a PDU session of the terminal, and is an interface gateway between a carrier network and an external network. The PGW-U is a user plane device of a 4G core network, provides a user plane service for a PDN connection of the terminal, and is an interface gateway between a carrier network and an external network. The UPF+PGW-U may alternatively be referred to as PGW-U+UPF provided that a device includes the functions of the UPF and the PGW-U the same as those of this device.

The SMF+PGW-C is a core network device shared by 4G and 5G, namely, a core network device deployed in both 4G and 5G, and includes functions of an SMF and of a PGW-C. The SMF is a control plane device of a 5G core network, provides a control plane service for a PDU session of the terminal, manages a 5G PDU session and 5G QoS, and is responsible for assigning an IP address to the terminal and selecting a UPF for the terminal. The PGW-C is a control plane device of a 4G core network, provides a user plane service for a PDN connection of the terminal, assigns an IP address to the terminal, and sets up an EPS bearer for the terminal. The SMF+PGW-C may alternatively be referred to as PGW-C+SMF provided that a device includes the functions of the SMF and the PGW-C the same as those of this device.

The PCF+PCRF is a core network device shared by 4G and 5G, namely, a core network device deployed in both 4G and 5G and includes a PCF and a PCRF. The PCRF is a 4G core network device and is responsible for generating a policy used by a user to set up a data bearer. The PCF is a 5G core network device and has a function similar to that of the PCRF. The PCF+PCRF may alternatively be referred to as PCRF+PCF provided that a device includes functions of the PCF and the PCRF the same as those of this device.

The UDM+HSS is a core network device shared by 4G and 5G, namely, a core network device deployed in both 4G and 5G and includes an HSS and a UDM. The HSS is a 4G core network device and is configured to store subscription data of a user. The UDM is a 5G core network device and is configured to store subscription data of a user. The UDM+HSS may alternatively be referred to as HSS+UDM provided that a device includes functions of the HSS and the UDM the same as those of this device.

An N26 interface is an interface between the MME and the AMF. Currently, this interface is optional. When the terminal moves between the 4G network and the 5G network, a context of the terminal may be transferred through the N26 interface.

The core network devices 100 in the first communications system include a UPF, an SMF, a PCF, and a UDM.

The core network devices 300 in the second communications system include a PGW-U, a PGW-C, a PCRF, and an HSS.

The terminal in the embodiments may be a mobile phone, a tablet computer, a notebook computer, a netbook, a portable electronic device, or the like.

With reference to some of the embodiments, the following describes the communication method used in a scenario of moving between different communications systems. The following uses an example in which the first communications system is a 5G communications system and the second communications system is a 4G communications system for description.

First, a communication method used in a scenario of moving between different communications systems corresponding to a scenario in which the terminal device moves from the first communications system to the second communications system and then moves back to the first communications system in a process in which the terminal transmits data for an application in the first communications system via a PDU session is described.

Herein, that the terminal moves from the first communications system to the second communications system may mean that the terminal in an idle mode selects or reselects from the first communications system to the second communications system, or the terminal in a connected mode is handed over from the first communications system to the second communications system.

That the terminal moves from the second communications system back to the second communications system may mean that the terminal in an idle mode selects or reselects from the second communications system to the first communications system, or the terminal in a connected mode is handed over from the second communications system to the first communications system.

Figure 2:
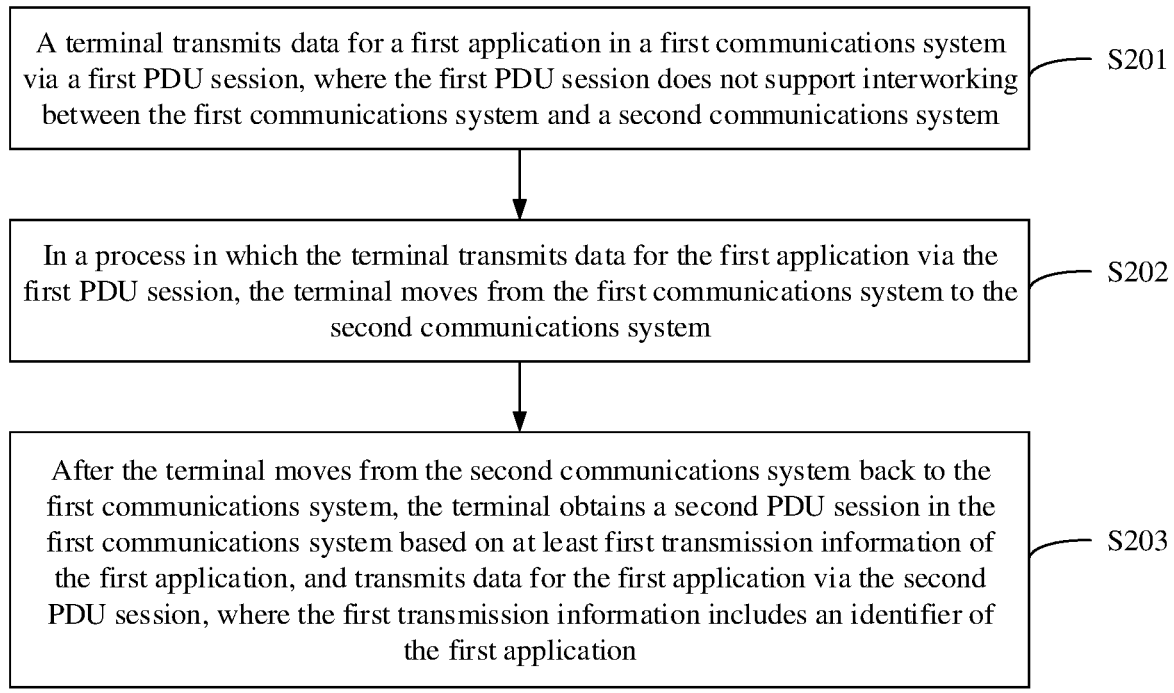
FIG. 2 is a flowchart of a communication method used in a scenario of move between different communications systems according to an embodiment.
Figure 3A:
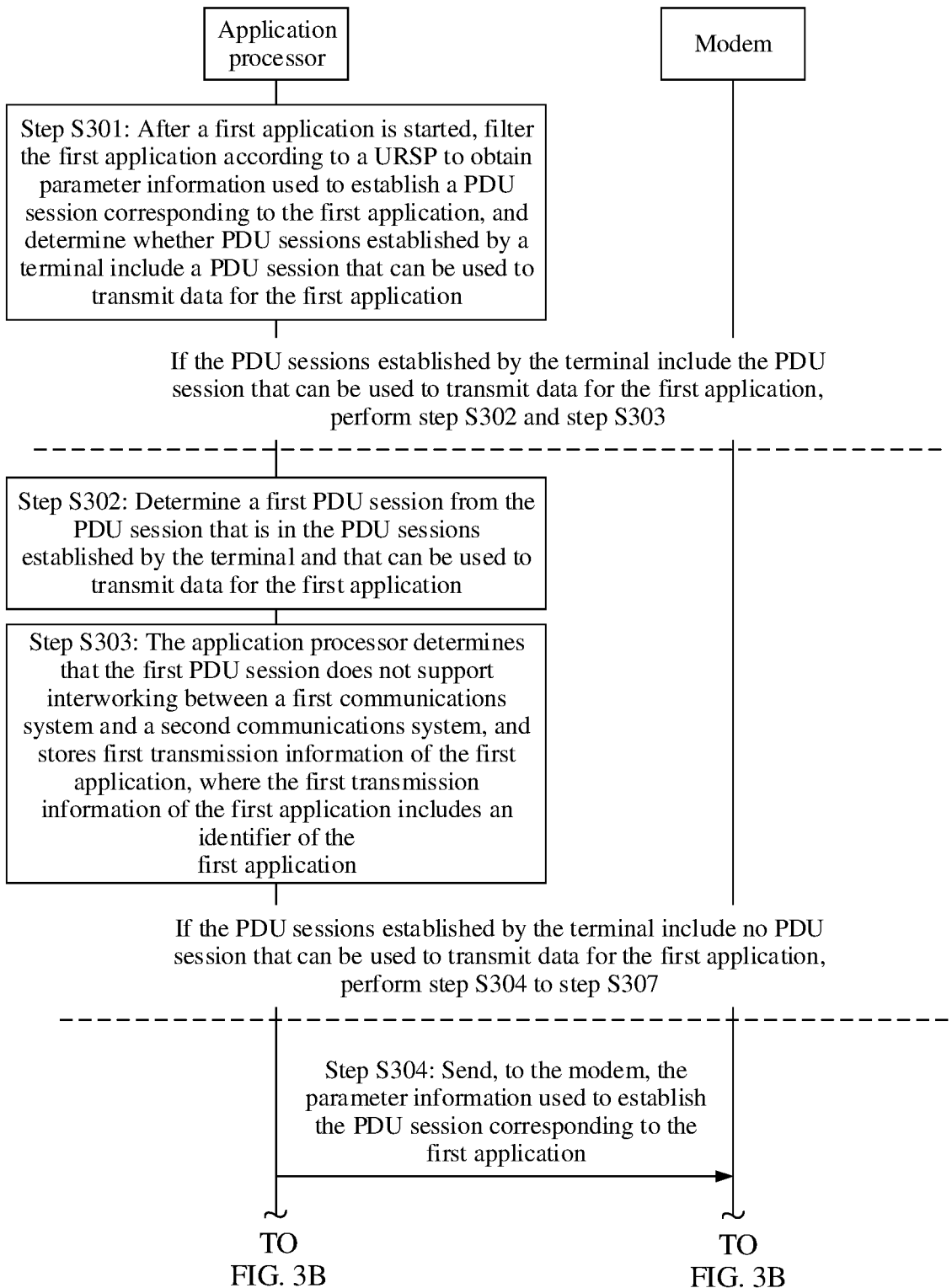
FIG. 3A to FIG. 3D are an interaction diagram of a communication method used in a scenario of move between different communications systems according to an embodiment.
Figure 3B:
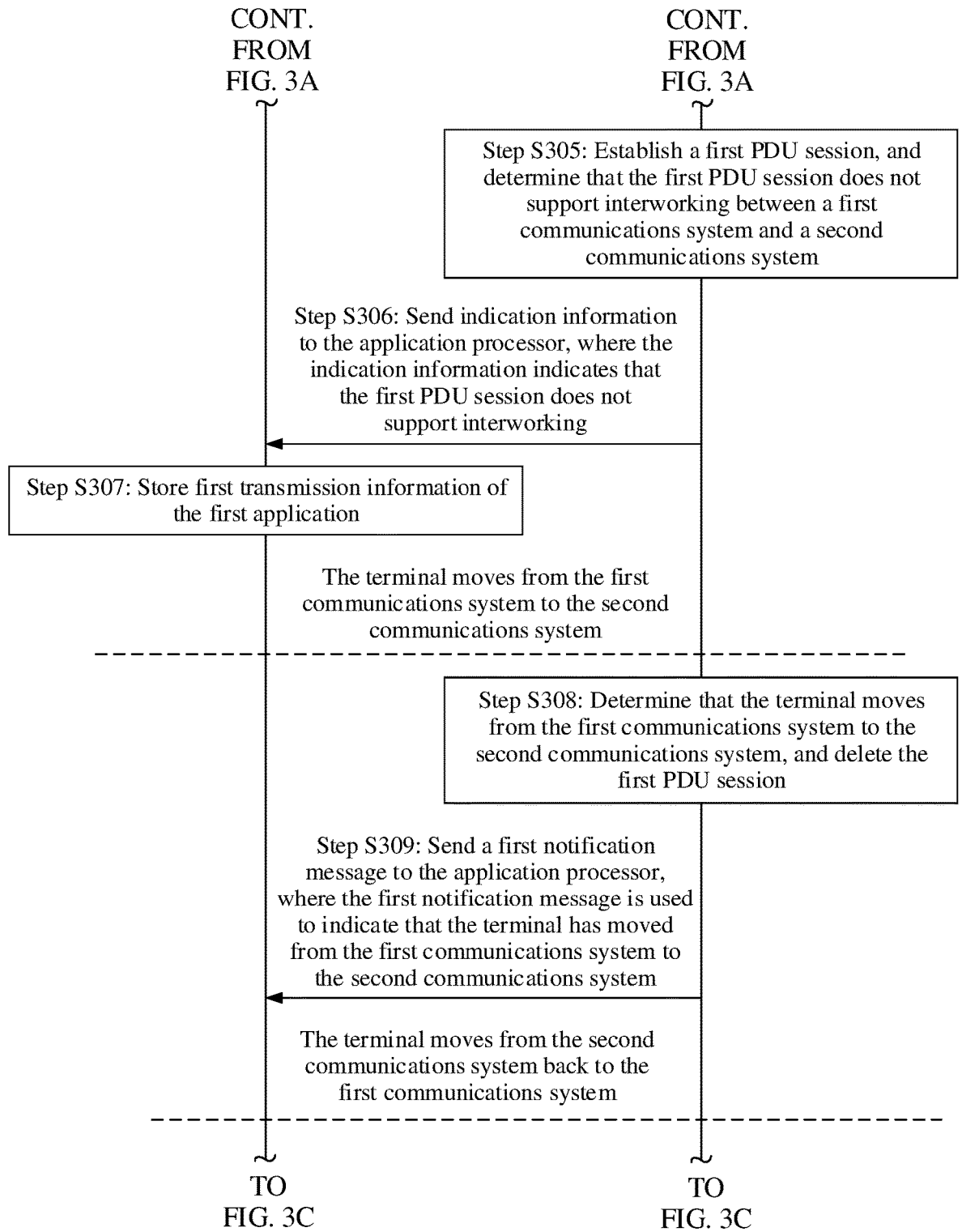
Figure 3C:
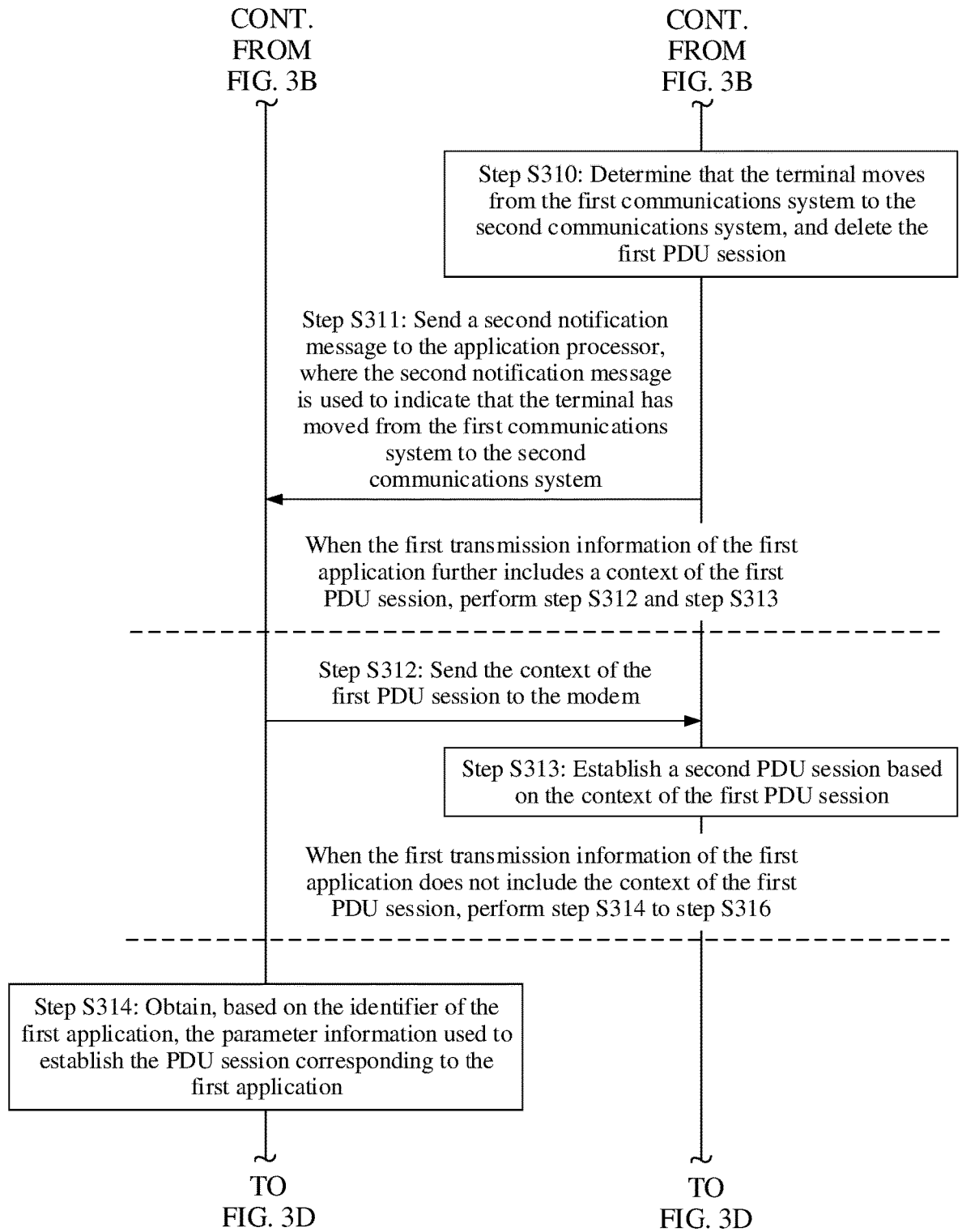
Figure 3D:
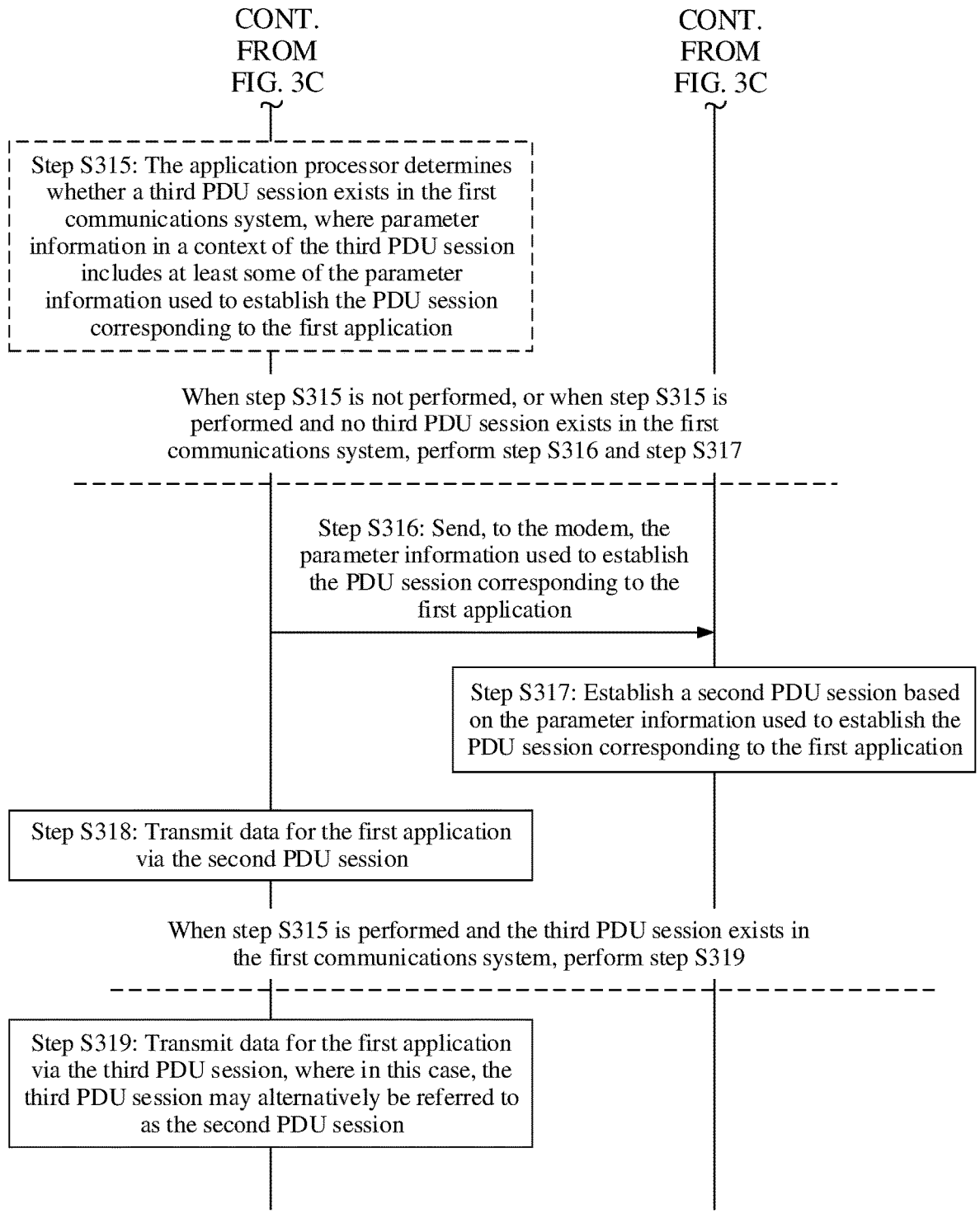

FIG. 2 is a first flowchart of a communication method used in a scenario of move between different communications systems according to an embodiment. Referring to FIG. 2, the method in this embodiment includes the following steps.

Step S201: A terminal transmits data for a first application in a first communications system via a first PDU session, where the first PDU session does not support interworking between the first communications system and a second communications system.

The first communications system may be a 5G communications system and the second communications system may be a 4G communications system in this embodiment.

A PDU session in the first communications system and a PDN connection in the second communications system are corresponding concepts. One PDU session may include a plurality of QoS flows, and one PDN connection may include a plurality of EPS bearers. The terminal may establish a plurality of PDU sessions in the first communications system. The plurality of PDU sessions may include one or more PDU sessions that support interworking between the first communications system and the second communications system. A PDU session that supports interworking between the first communications system and the second communications system has the following property: When the terminal moves from the first communications system to the second communications system, a PDN connection corresponding to the PDU session may be automatically established or generated in the second communications system, and the PDU session and the PDN connection have a same IP address.

The plurality of PDU sessions established by the terminal in the first communications system also include one or more PDU sessions that do not support interworking between the first communications system and the second communications system. A PDU session that does not support interworking between the first communications system and the second communications system has the following property: When the terminal moves from the first communications system to the second communications system, a PDN connection corresponding to the PDU session cannot be established in the second communications system. In other words, a PDN connection that uses a same IP address as the PDU session cannot be established or generated. In addition, the PDU session is locally deleted after the terminal accesses the second communications system.

The communication method used in a scenario of moving between different communications systems in this embodiment is applicable to the first application for which data is transmitted via the first PDU session that does not support interworking between the first communications system and the second communications system.

After the first application is started in the first communications system, the terminal transmits data for the first application via the first PDU session. In this embodiment, that the first application is started means that the first application enters a running state or the first application is activated. After the first application is started, the first application runs in the foreground or runs in the background.

A process in which the terminal obtains the first PDU session may be as follows.

The terminal filters the first application according to a user equipment route selection policy (URSP), to obtain parameter information used to establish a PDU session corresponding to the first application. The parameter information used to establish the PDU session corresponding to the first application may include DNN information, SSC mode information, IP address information, QoS flow information, a slice identifier, access mode precedence, and the like. The QoS flow information includes one or more of the following information: a session aggregate maximum bit rate (AMBR), an SSC mode, a PDU session identifier, and a QoS rule. The QoS rule may be one QoS rule or a plurality of QoS rules. The QoS rule includes one or more of the following information: a QoS rule identifier, a QoS flow identifier, precedence, and a packet filter; or the QoS rule includes one or more of the following information: a QoS rule identifier, a QoS flow identifier, precedence, and a packet filter identifier. The packet filter includes a packet filter attribute and a packet filter identifier. Further, the QoS flow information may include a combination of one or more pieces of information of a 5QI, an ARP, a GFBR, an MFBR, and notification control that are corresponding to a QoS flow.

The PDU session corresponding to the first application is a PDU session that can be used to transmit data for the first application.

In an implementation, after obtaining the parameter information used to establish the PDU session corresponding to the first application, the terminal determines whether the established PDU sessions include a PDU session that can be used to transmit data for the first application. If the PDU sessions established by the terminal include a PDU session whose parameter information in a context is at least some of the parameter information used to establish the PDU session corresponding to the first application, the terminal determines that the established PDU sessions include a PDU session that can be used to transmit data for the first application. Otherwise, the terminal determines that the established PDU sessions include no PDU session that can be used to transmit data for the first application.

For example, the PDU sessions established by the terminal include a PDU session a, and parameter information in a context of the PDU session a is at least some of the parameter information used to establish the PDU session corresponding to the first application. For example, DNN information in the parameter information used to establish the PDU session corresponding to the first application includes a $DNN_1$ and a $DNN_2$, and DNN information in the context of the PDU session a is the $DNN_1$. The PDU session a is a PDU session that can be used to transmit data for the first application. In other words, the PDU session a is a PDU session corresponding to the first application.

When the terminal determines that the established PDU sessions include a PDU session that can be used to transmit data for the first application, the terminal determines the first PDU session from the PDU sessions that can be used to transmit data for the first application in the established PDU sessions. For example, the first PDU session is the PDU session a in the foregoing example. Further, in this case, the terminal further stores information indicating that the first PDU session does not support interworking between the first communications system and the second communications system. The terminal determines, based on the information, that the first PDU session does not support interworking between the first communications system and the second communications system.

When the terminal determines that the established PDU sessions include no PDU session that can be used to transmit data for the first application, the terminal establishes the first PDU session based on the parameter information used to establish the PDU session corresponding to the first application.

The terminal establishes, based on the parameter information used to establish the PDU session corresponding to the first application, the first PDU session by interacting with a core network device corresponding to the first communications system. For implementation, refer to an existing PDU session establishment method. Details are not described in this embodiment. The core network device corresponding to the first communications system is a core network device in the first communications system in core network devices (for example, 200 in FIG. 1) deployed in both the first communications system and the second communications system, or the core network device corresponding to the first communications system is a core network device (for example, 100 in FIG. 1) deployed only in the first communications system.

In a process of establishing the first PDU session, the terminal sends a PDU session establishment request to the core network device corresponding to the first communications system. The PDU session establishment request includes the parameter information used to establish the PDU session corresponding to the first application. The core network device corresponding to the first communications system determines target parameter information from the parameter information used to establish the PDU session corresponding to the first application, and sends the determined target parameter information to the terminal, so that the terminal establishes the first PDU session based on the target parameter information. The target parameter information is parameter information included in a context of the first PDU session.

In a process of establishing the first PDU session, if the terminal does not receive, from the core network device corresponding to the first communications system, parameter information that is corresponding to the target parameter information and that is used to establish a PDN connection in the second communications system, the terminal determines that the first PDU session does not support interworking between the first communications system and the second communications system.

Thus, after obtaining the first PDU session by using the foregoing method, the terminal may transmit data for the first application via the first PDU session.

Further, after the terminal determines that the first PDU session does not support interworking between the first communications system and the second communications system, the terminal may store first transmission information of the first application. The transmission information of the first PDU session may include an identifier of the first application, and further, the transmission information of the first PDU session may include the context of the first PDU session.

Step S202: In a process in which the terminal transmits data for the first application via the first PDU session, the terminal moves from the first communications system to the second communications system.

Optionally, the terminal may move from the first communications system to the second communications system through handover. During handover, the terminal in a connected mode receives a handover command. The handover command may be sent by a base station in the first communications system to the terminal.

Optionally, the terminal may move from the first communications system to the second communications system through selection or reselection.

After the terminal moves from the first communications system to the second communications system, the first PDU session that is used to transmit data for the first application in the first communications system is released.

Step S203: After the terminal moves from the second communications system back to the first communications system, the terminal obtains a second PDU session in the first communications system based on at least the first transmission information of the first application, and transmits data for the first application via the second PDU session, where the first transmission information includes the identifier of the first application.

Optionally, the terminal may move from the second communications system to the first communications system through handover. During handover, the terminal in a connected mode receives a handover command. The handover command may be sent by a base station in the second communications system to the terminal.

Optionally, the terminal may move from the second communications system to the first communications system through selection or reselection.

After the terminal moves from the second communications system back to the first communications system, because the first PDU session has been released, to continue to transmit data for the first application, the terminal needs to obtain another PDU session (referred to as the second PDU session in this embodiment) to transmit data for the first application. A manner in which the terminal obtains the second PDU session in the first communications system based on at least the first transmission information of the first application may include but is not limited to the following four manners:

Manner 1: If the first transmission information of the first application further includes the context of the first PDU session, the terminal establishes the second PDU session based on the context of the first PDU session, and transmits data for the first application via the second PDU session.

In this manner, the second PDU session established based on the context of the first PDU session is the same as information such as a QoS flow of the first PDU session. The second PDU session is used to transmit data for the first application, so that data transmission quality of the first application does not deteriorate. In addition, in this manner, the second PDU session is established based on the context of the first PDU session, and the second PDU session is established relatively efficiently.

Manner 2 may be implemented by steps b1 and b2.

b1: The terminal obtains, based on the identifier of the first application, the parameter information used to establish the PDU session corresponding to the first application.

The terminal filters the first application according to the URSP, to obtain the parameter information used to establish the PDU session corresponding to the first application.

b2: The terminal establishes the second PDU session based on the parameter information used to establish the PDU session corresponding to the first application.

For a method for establishing the second PDU session by the terminal based on the parameter information used to establish the PDU session corresponding to the first application, refer to the foregoing method for "establishing the first PDU session based on the parameter information used to establish the PDU session corresponding to the first application". Details are not described herein again.

In this manner, the second PDU session may be established when the first transmission information does not include the context of the first PDU. In addition, in this manner, the parameter information used to establish the PDU session corresponding to the first application can be obtained based on the identifier of the first application. That is, the parameter information of the PDU session that matches data transmission of the first application can be obtained. The second PDU session established based on the parameter information of the PDU session that matches the data transmission of the first application is used to transmit data for the first application, so that data transmission quality of the first application does not deteriorate.

Manner 3 may be implemented by steps c1 and c2.

c1: The terminal obtains, based on the identifier of the first application, the parameter information used to establish the PDU session corresponding to the first application.

c2: If the terminal has no third PDU session in the first communications system, and parameter information in a context of the third PDU session includes at least some of the parameter information used to establish the PDU session corresponding to the first application, the terminal establishes the second PDU session in the first communications system based on the parameter information used to establish the PDU session corresponding to the first application.

Different from Manner 2, in this manner, whether the third PDU session exists in the first communications system needs to be determined, and the third PDU session meets the following condition: the parameter information in the context of the third PDU session includes at least some of the parameter information used to establish the PDU session corresponding to the first application. When determining that no third PDU session exists in the first communications system, the terminal establishes the second PDU session in the first communications system based on the parameter information used to establish the PDU session corresponding to the first application.

Same as Manner 2, in this manner, data transmission quality of the application does not deteriorate, either, and power consumption of the terminal can be further reduced.

Manner 4 may be implemented by steps d1 and d2.

d1: The terminal obtains, based on the identifier of the first application, the parameter information used to establish the PDU session corresponding to the first application.

d2: When the terminal has the third PDU session in the first communications system, and the parameter information in the context of the third PDU session includes at least some of the parameter information used to establish the PDU session corresponding to the first application, the terminal obtains the third PDU session as the second PDU session.

In this case, that the terminal transmits data for the first application via the second PDU session includes: the terminal transmits data for the first application via the third PDU session, where the third PDU is the second PDU session.

In this manner, data transmission quality of the application does not deteriorate, either, and power consumption of the terminal can be further reduced.

After obtaining the second PDU session, the terminal may transmit data for the first application via the second PDU session based on the identifier of the first application. The transmitting data for the first application via the second PDU session based on the identifier of the first application means that the terminal learns, based on the identifier of the first application included in the first transmission information, that data needs to be transmitted for the first application via the second PDU session, and binds the first application to the second PDU session, to transmit data for the first application via the second PDU session.

The following describes, with reference to FIG. 3A to FIG. 3D, internal interaction of the terminal corresponding to step S201 to step S203.

The terminal may include a modem and an application processor. In a possible implementation, the application processor may be understood as a processor that includes a processing unit in a framework of the terminal and a control unit configured to control an application (APP). In another possible implementation, the application processor may be understood as a component including a framework unit and an APP unit of the terminal. The framework may alternatively be referred to as an application framework layer, is a further encapsulation of a runtime library layer, and is provided for an upper layer to invoke through an interface, to implement service support for an application layer.

FIG. 3A to FIG. 3D are an interaction diagram of a communication method used in a scenario of move between different communications systems according to an embodiment. Referring to FIG. 3A to FIG. 3D, the method includes the following steps.

Step S301: After a first application is started, an application processor filters the first application according to a URSP to obtain parameter information used to establish a PDU session corresponding to the first application, and determines whether PDU sessions established by a terminal include a PDU session that can be used to transmit data for the first application.

If the PDU sessions established by the terminal include a PDU session that can be used to transmit data for the first application, step S302 and step S303 are to be performed.

Step S302: The application processor determines a first PDU session from the PDU session that is in the PDU sessions established by the terminal and that can be used to transmit data for the first application.

Step S303: The application processor determines that the first PDU session does not support interworking between a first communications system and a second communications system, and stores first transmission information of the first application, where the first transmission information includes an identifier of the first application.

When the first PDU session does not support interworking between the first communications system and the second communications system, the terminal stores information indicating that the first PDU session does not support interworking between the first communications system and the second communications system, and the application processor determines, based on the information, that the first PDU session does not support interworking between the first communications system and the second communications system.

If the PDU sessions established by the terminal include no PDU session that can be used to transmit data for the first application, step S304 to step S307 are to be performed.

Step S304: The application processor sends, to a modem, the parameter information used to establish the PDU session corresponding to the first application.

Step S305: The modem establishes a first PDU session, and determines that the first PDU session does not support interworking between a first communications system and a second communications system.

The modem establishes the first PDU session by interacting with a core network device corresponding to the first communications system, and the modem determines that in a process of establishing the first PDU session, no parameter information that is used to establish a PDN connection and that is corresponding to the target parameter information is received from the core network device corresponding to the first communications system. In other words, the modem determines that the first PDU session does not support interworking between the first communications system and the second communications system.

Step S306: The modem sends indication information to the application processor, where the indication information indicates that the first PDU session does not support interworking.

Step S307: The application processor stores first transmission information of the first application.

When the terminal moves from the first communications system to the second communications system:

Step S308: The modem determines that the terminal moves from the first communications system to the second communications system, and deletes the first PDU session.

Step S309: The modem sends a first notification message to the application processor, where the first notification message is used to indicate that the terminal has moved from the first communications system to the second communications system.

When the terminal moves from the second communications system back to the first communications system:

Step S310: The modem determines that the terminal moves from the second communications system back to the first communications system.

Step S311: The modem sends a second notification message to the application processor, where the second notification message is used to indicate that the terminal has moved from the second communications system back to the first communications system.

When the first transmission information further includes a context of the first PDU session, step S312 and step S313 are to be performed.

Step S312: The application processor sends the context of the first PDU session to the modem.

As described in step S303 and step S307, the application processor of the terminal stores the first transmission information of the first application. Therefore, the application processor of the terminal sends the context of the first PDU session to the modem.

Step S313: The modem establishes a second PDU session based on the context of the first PDU session.

When the first transmission information does not include the context of the first PDU session, step S314 to step S317 are to be performed.

Step S314: The application processor obtains, based on the identifier of the first application, the parameter information used to establish the PDU session corresponding to the first application.

The application processor filters the first application according to the URSP, to obtain the parameter information used to establish the PDU session corresponding to the first application.

Step S315: The application processor determines whether a third PDU session exists in the first communications system, where parameter information in a context of the third PDU session includes at least some of the parameter information used to establish the PDU session corresponding to the first application.

This step is optional.

When step S315 is not performed, or when step S315 is performed and no third PDU session exists in the first communications system, step S316 to step S318 are to be performed.

Step S316: The application processor sends, to the modem of the terminal, the parameter information used to establish the PDU session corresponding to the first application.

Step S317: The modem establishes a second PDU session in the first communications system based on the parameter information used to establish the PDU session corresponding to the first application.

Step S318: The application processor transmits data for the first application via the second PDU session.

When step S315 is performed and the third PDU session exists in the first communications system, step S319 is to be performed.

Step S319: The application processor transmits data for the first application via the third PDU session. In this case, the third PDU session may alternatively be referred to as the second PDU session.

Therefore, for the application that is in the terminal and for which the terminal transmits data via the first PDU session that does not support interworking between the first communications system and the second communications system, when the terminal moves from the first communications system to the second communications system and then moves from the second communications system back to the first communications system, in this embodiment, the terminal determines the second PDU session based on the first transmission information of the application, and transmits data for the application via the second PDU session. The first transmission information includes at least the identifier of the application, and the terminal may ensure that the determined second PDU session can meet a data transmission quality requirement of the application. Therefore, data transmission quality of the application can be ensured when the terminal moves from the first communications system to the second communications system and then moves from the second communications system back to the first communications system. That is, a problem that when the terminal moves from the first communications system to the second communications system and then moves from the second communications system back to the first communications system, data transmission quality of the application deteriorates because the terminal transmits data for the application via a default PDU session and the default PDU session cannot meet the data transmission quality requirement of the application is resolved.

In addition, with reference to an embodiment, for the first application for which data is transmitted via the first PDU session in the first communications system, the first PDU session does not support interworking between the first communications system and the second communications system. When the terminal moves from the first communications system to the second communications system, a corresponding communication method used in a scenario of move between different communications systems is described.

Figure 4:
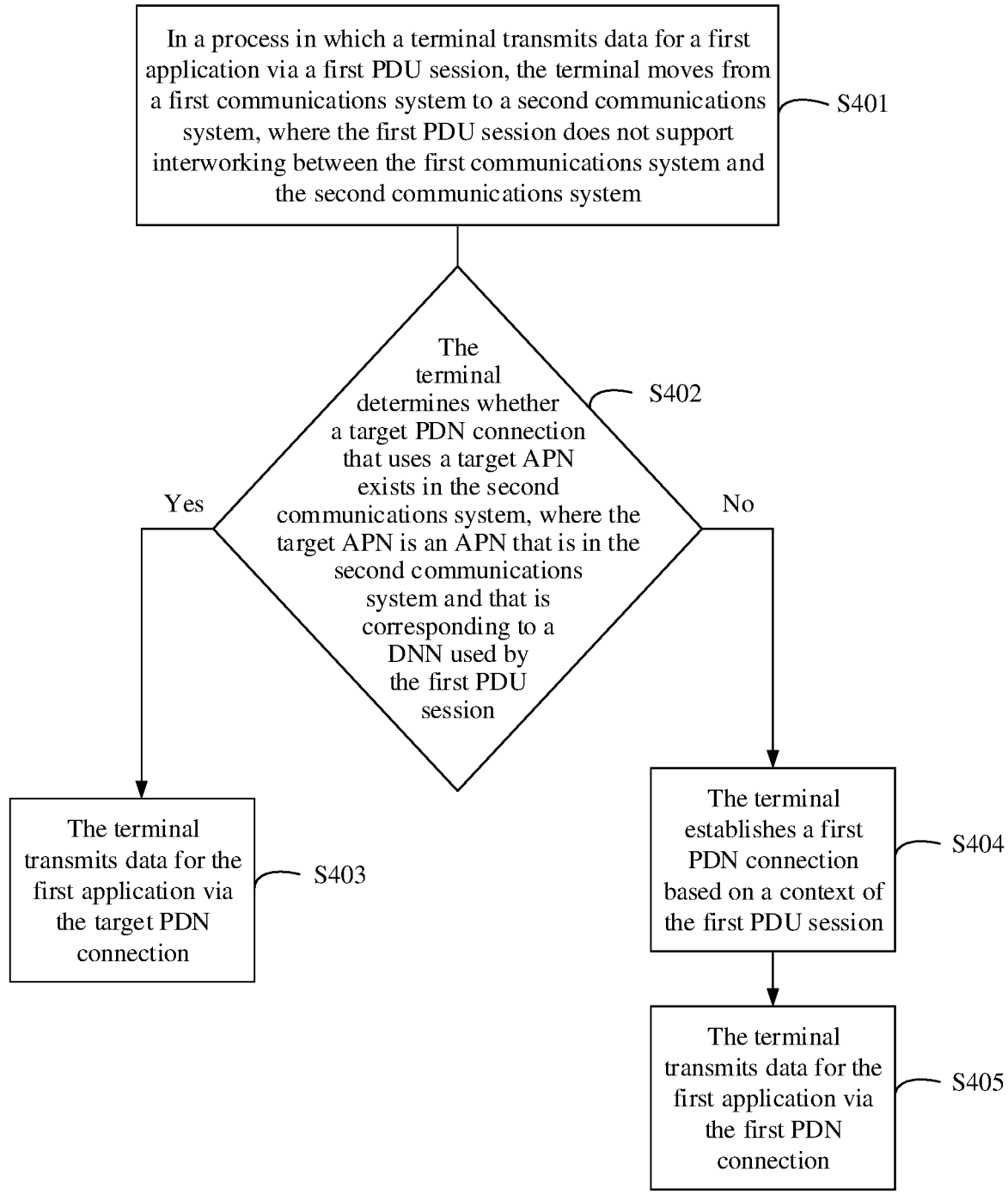
FIG. 4 is a flowchart of a communication method used in a scenario of move between different communications systems according to an embodiment.

FIG. 4 is a second flowchart of a communication method used in a scenario of move between different communications systems according to an embodiment. Referring to FIG. 4, the method in this embodiment includes the following steps.

Step S401: In a process in which a terminal transmits data for a first application via a first PDU session, the terminal moves from a first communications system to a second communications system, where the first PDU session does not support interworking between the first communications system and the second communications system.

For an implementation of this step, refer to the description in step S202 in the embodiment shown in FIG. 2. Details are not described again in this embodiment.

Step S402: The terminal determines whether a target PDN connection that uses a target APN exists in the second communications system, where the target APN is an APN that is in the second communications system and that is corresponding to a DNN used by the first PDU session, first transmission information of the first application includes a context of the first PDU session, and the context of the first PDU session includes the DNN used by the first PDU session.

Each DNN has an APN corresponding to the DNN in the second communications system. In other words, each DNN has an APN in the second communications system to which the DNN maps.

When the first transmission information of the first application includes the context of the first PDU session, and the context of the first PDU session includes the DNN used by the first PDU session, the terminal obtains the APN that is in the second communications system and that is corresponding to the DNN used by the first PDU session, and the APN is referred to as a target APN in this embodiment. In the second communications system, the terminal may obtain, by using a local mapping method, the target APN that is in the second communications system and that is corresponding to the DNN used by the first PDU session. For the local mapping method, refer to an existing method. Details are not described herein.

Then, the terminal determines whether the terminal has the target PDN connection that uses the target APN in one or more PDN connections in the second communications system.

It may be understood that, if the terminal has the target PDN connection in the second communications system, a target PDU session that supports interworking may exist in the first communications system, and a DNN used by the target PDU session is the same as the DNN used by the first PDU session. However, the target PDU session is not used to transmit data for the first application. In this case, the target PDN connection is a PDN connection that is corresponding to the target PDU session and that is automatically established by the terminal after the terminal moves to the second communications system, and the target PDU session and the target PDN connection use a same IP address.

When the target PDN connection exists in the second communications system, step S403 is to be performed.

Step S403: The terminal transmits data for the first application via the target PDN connection.

The terminal may transmit data for the first application via the target PDN connection based on an identifier of the first application. The transmitting data for the first application via the target PDN connection based on the identifier of the first application means that the terminal learns, based on the identifier that is of the first application and that is included in the first transmission information, that the target PDN connection needs to be used to transmit data for the first application, and binds the first application to the target PDN connection, to transmit data for the first application via the target PDN connection.

When no target PDN connection exists in the second communications system, step S404 and step S405 are to be performed.

Step S404: The terminal establishes a first PDN connection based on the context of the first PDU session.

The terminal obtains parameters that are corresponding to first parameters in the context of the first PDU session and that are used to establish a PDN connection, and the terminal establishes the target PDN connection based on the parameters that are corresponding to the first parameters and that are used to establish a PDN connection. That is, parameters used by the terminal to establish the first PDN connection includes the parameters that are corresponding to the first parameters and that are used to establish a PDN connection. For example, an APN used by the first PDN connection is the target APN. The first parameter in the context of the first PDU session is a parameter that has a corresponding parameter used to establish a PDN connection in the context of the first PDU session, and a parameter DNN in the context of the first PDU session is a first parameter in the context of the first PDU session.

It may be understood that an IP address used for the first PDN connection is different from an IP address used for the first PDU session. For a process in which the terminal establishes a PDN connection, refer to an existing method for establishing a PDN connection. Details are not described in this embodiment.

Step S405: The terminal transmits data for the first application via the first PDN connection.

The terminal may transmit data for the first application via the first PDN connection based on the identifier of the first application. The transmitting data for the first application via the first PDN connection based on the identifier of the first application means that the terminal learns, based on the identifier that is of the first application and that is included in the first transmission information, that the first PDN connection needs to be used to transmit data for the first application, and binds the first application to the first PDN connection, to transmit data for the first application via the first PDN connection.

Figure 5A:
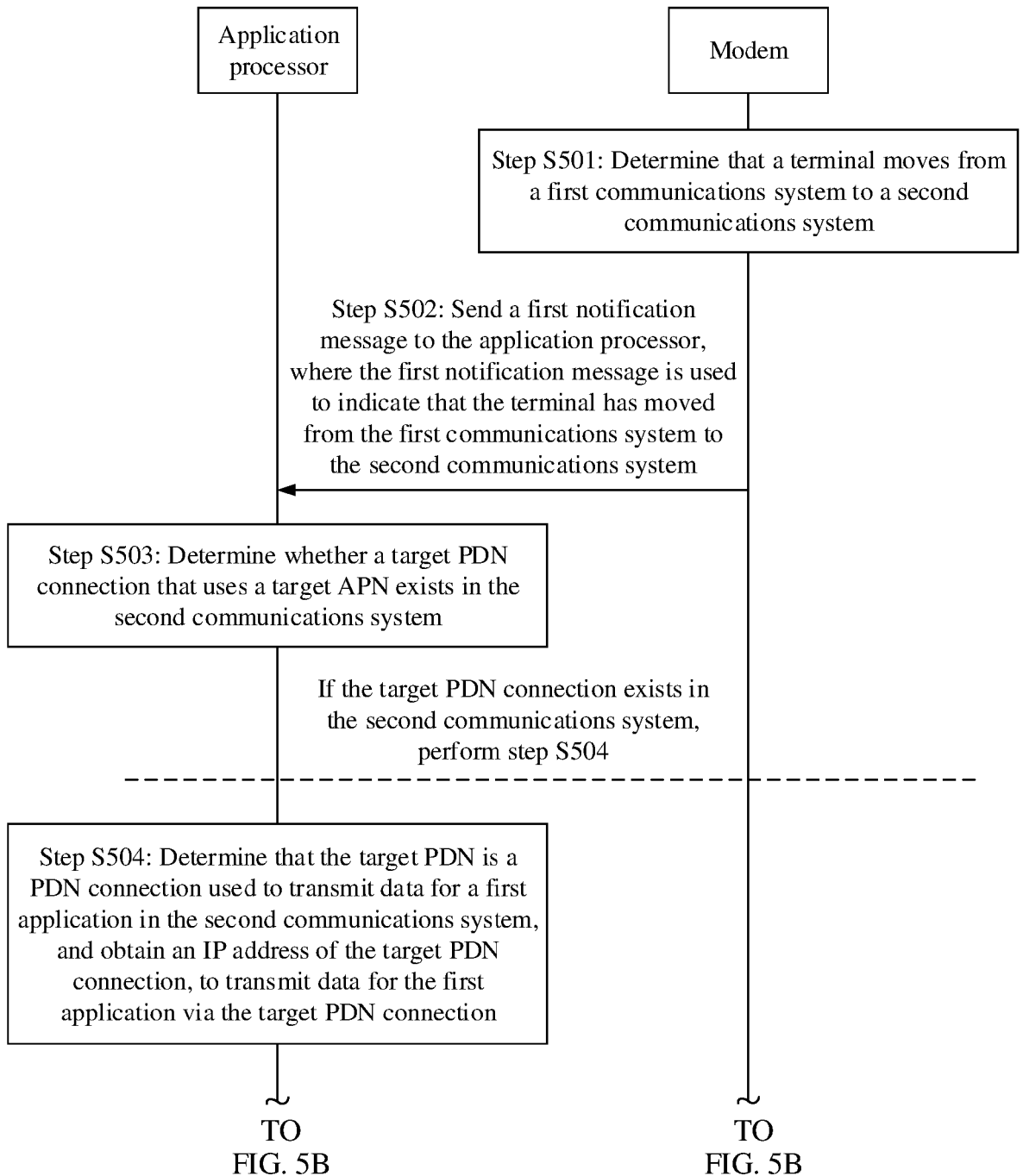
FIG. 5A and FIG. 5B are an interaction diagram of a communication method used in a scenario of move between different communications systems according to an embodiment.
Figure 5B:
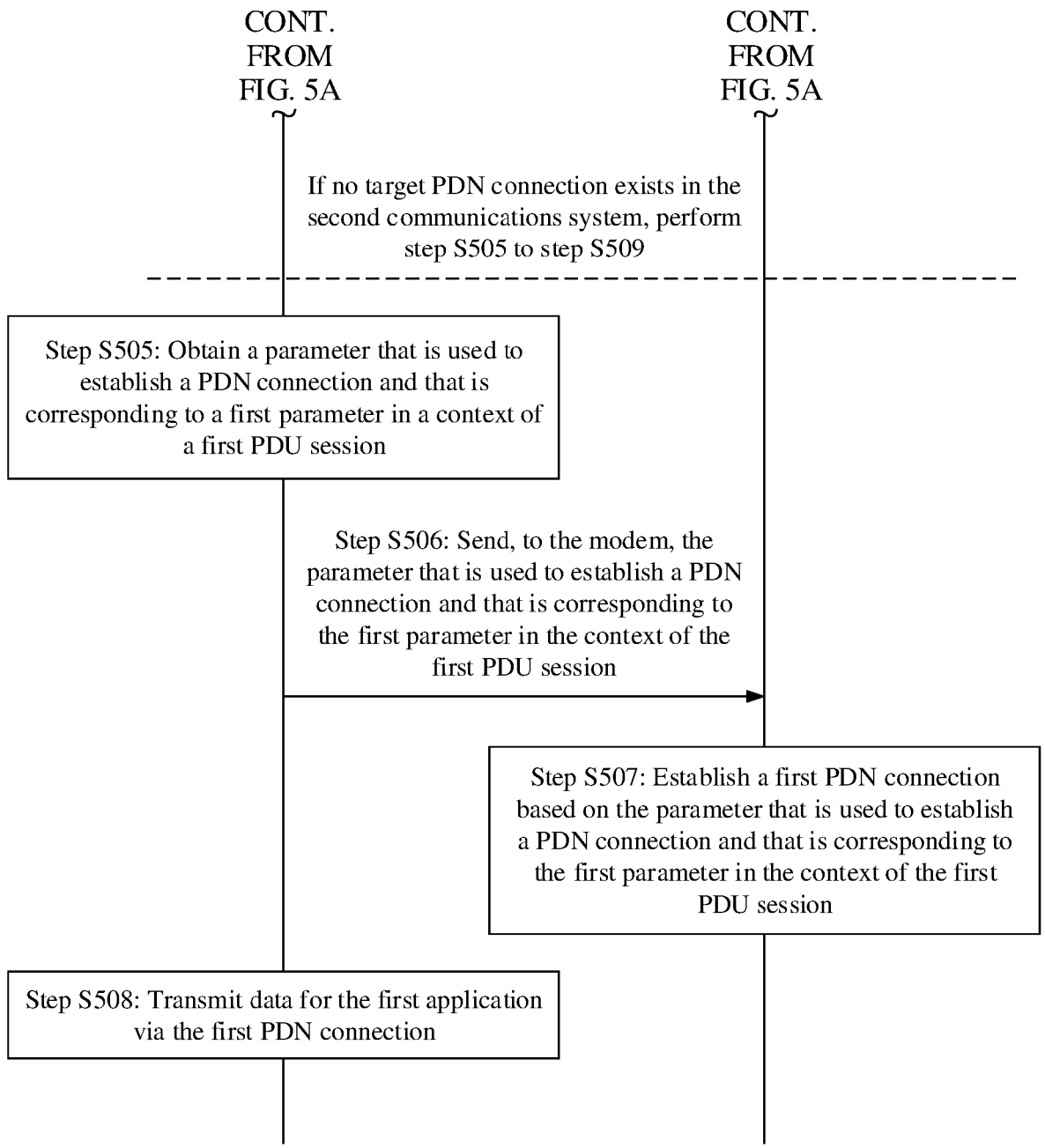

The following describes, with reference to FIG. 5A and FIG. 5B, internal interaction of a terminal when the terminal moves from the first terminal system to the second communications system.

FIG. 5A and FIG. 5B are an interaction diagram of a communication method used in a scenario of move between different communications systems according to an embodiment. Referring to FIG. 5A and FIG. 5B, the method includes the following steps.

Step S501: A modem determines that a terminal moves from a first communications system to a second communications system.

Step S502: The modem sends a first notification message to an application processor, where the first notification message is used to indicate that the terminal has moved from the first communications system to the second communications system.

Step S503: The application processor determines whether a target PDN connection that uses a target APN exists in the second communications system.

If the target PDN connection exists in the second communications system, step S504 is to be performed.

Step S504: The application processor determines that the target PDN is a PDN connection used to transmit data for a first application in the second communications system, and obtains an IP address of the target PDN connection, to transmit data for the first application via the target PDN connection.

If no target PDN connection exists in the second communications system, step S505 to step S509 are to be performed.

Step S505: The application processor obtains a parameter that is used to establish a PDN connection and that is corresponding to a first parameter in a context of a first PDU session.

Step S506: The application processor sends, to the modem, the parameter that is used to establish a PDN connection and that is corresponding to the first parameter in the context of the first PDU session.

Step S507: The modem establishes a first PDN connection based on the parameter that is used to establish a PDN connection and that is corresponding to the first parameter in the context of the first PDU session.

Step S508: The application processor transmits data for the first application via the first PDN connection.

Thus, for the first application for which data is transmitted in the first communications system via the first PDU session that does not support interworking between the first communications system and the second communications system, when the terminal moves from the first communications system to the second communications system, in this embodiment, a PDN connection used to transmit data for this application in the second communications system is obtained based on the context of the first PDU session in the transmission information of the first application, so that data can still be transmitted for the first application in the second communications system. This ensures normal running of the first application when the terminal moves between different communications systems.

Then, a method in which when the terminal starts a second application in the second communications system, and a PDN connection used to transmit data for the second application in the second communications system does not support interworking between the first communications system and the second communications system, after the terminal moves from the second communications system to the first communications system, the terminal transmits data for the second application is described by using an embodiment.

Figure 6:
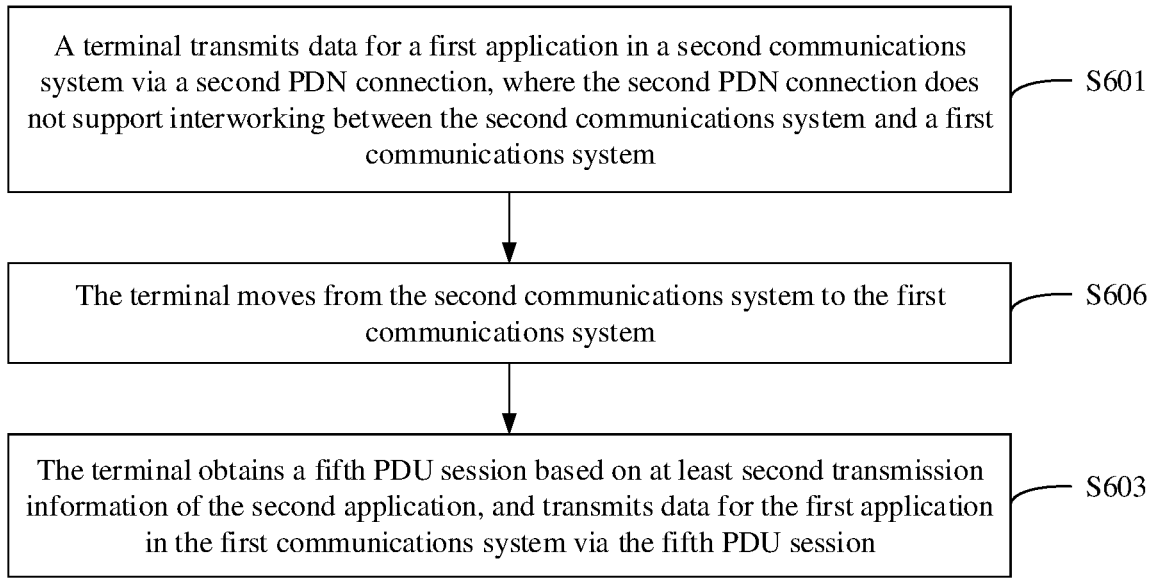
FIG. 6 is a flowchart 3 of a communication method used in a scenario of move between different communications systems according to an embodiment.

FIG. 6 is flowchart 3 of a communication method used in a scenario of move between different communications systems according to an embodiment. Referring to FIG. 6, the method in this embodiment includes the following steps.

Step S601: A terminal transmits data for a first application in a second communications system via a second PDN connection, where the second PDN connection does not support interworking between the second communications system and a first communications system.

A second application in this embodiment is an application started when the terminal is in the second communications system. After the terminal determines that the second PDN connection does not support interworking between the second communications system and the first communications system, the terminal may store second transmission information of the second application. The second transmission information includes an identifier of the second application.

A method for determining, by the terminal, that the second PDN connection does not support interworking between the first communications system and the second communications system may be: in a process of establishing the second PDN connection, no parameter that is used to establish a PDU session and that is corresponding to a parameter used for the second PDN connection is received from a core network device in the second communications system.

Step S602: The terminal moves from the second communications system to the first communications system.

Step S603: The terminal obtains a fifth PDU session based on at least the second transmission information of the second application and transmits data for the first application in the first communications system via the fifth PDU session.

After the terminal moves from the second communications system back to the first communications system, the terminal needs to obtain a PDU session (referred to as the fifth PDU session in this embodiment) to transmit data for the second application. A manner in which the terminal obtains the fifth PDU session in the first communications system based on at least the first transmission information of the second application may include but is not limited to the following three manners:

Manner 1 may be implemented by steps e1 and e2.

e1: The terminal obtains, based on the identifier of the second application in the second transmission information, parameter information used to establish a PDU session corresponding to the second application.

The terminal filters the second application according to a URSP, to obtain the parameter information used to establish the PDU session corresponding to the second application.

e2: The terminal establishes the fifth PDU session based on the parameter information used to establish the PDU session corresponding to the second application.

For a method for establishing the fifth PDU session by the terminal based on the parameter information used to establish the PDU session corresponding to the second application, refer to the foregoing method for "establishing the first PDU session based on the parameter information used to establish the PDU session corresponding to the first application". Details are not described herein again.

In this manner, the parameter information used to establish the PDU session corresponding to the second application can be obtained based on the identifier of the second application. That is, the parameter information of the PDU session that matches data transmission of the second application can be obtained. The fifth PDU session established based on the parameter information of the PDU session that matches the data transmission of the second application is used to transmit data for the second application, so that data transmission quality of the second application does not deteriorate.

Manner 2 may be implemented by steps f1 and f2.

f1: The terminal obtains, based on the identifier of the second application, the parameter information used to establish the PDU session corresponding to the second application.

f2: If the terminal has no fourth PDU session in the first communications system, and parameter information in a context of the fourth PDU session includes at least some of the parameter information used to establish the PDU session corresponding to the first application, the terminal establishes the fifth PDU session in the first communications system based on the parameter information used to establish the PDU session corresponding to the second application.

Different from Manner 1, in this manner, whether the fourth PDU session exists in the first communications system needs to be determined, and the fourth PDU session meets the following condition: The parameter information in the context of the fourth PDU session includes at least some of the parameter information used to establish the PDU session corresponding to the second application. When determining that no fourth PDU session exists in the first communications system, the terminal establishes the fifth PDU session in the first communications system based on the parameter information used to establish the PDU session corresponding to the second application.

For a method for determining, by the terminal, whether the terminal has the fourth PDU session in the first communications system, refer to the method for determining, by the terminal, whether the terminal has the first PDU session in the first communications system in the embodiment shown in FIG. 2. Details are not described herein again.

Same as Manner 2, in this manner, data transmission quality of the application does not deteriorate, either, and power consumption of the terminal can be further reduced.

Manner 3 may be implemented by steps g1 and g2.

g1: The terminal obtains, based on the identifier of the second application, the parameter information used to establish the PDU session corresponding to the second application.

g2: When the terminal has the fourth PDU session in the first communications system, and the parameter information in the context of the fourth PDU session includes at least some of the parameter information used to establish the PDU session corresponding to the second application, the terminal obtains the fourth PDU session as the fifth PDU session.

In this case, that the terminal transmits data for the first application via the fifth PDU session includes: the terminal transmits data for the first application via the fourth PDU session, where the fourth PDU is the fifth PDU session.

In this manner, data transmission quality of the application does not deteriorate, either, and power consumption of the terminal can be further reduced.

After obtaining the fifth PDU session, the terminal may transmit data for the second application via the fifth PDU session based on the identifier of the second application. The transmitting data for the second application via the fifth PDU session based on the identifier of the second application means that the terminal learns, based on the identifier of the second application included in the second transmission information, that data needs to be transmitted for the second application via the fourth PDU session, and binds the second application to the fifth PDU session, to transmit data for the second application via the fifth PDU session.

Therefore, after an application is started in the second communications system, if a PDN connection used to transmit data for the application does not support interworking between the first communications system and the second communications system, when the terminal moves from the second communications system to the first communications system, the terminal may determine, based on an identifier of the application, a PDU session that can meet a data transmission quality requirement of the application, and transmit data for the application via the PDU session, to ensure data transmission quality of the application when the terminal moves from the second communications system to the first communications system.

The foregoing describes the communication method used in a scenario of move between different communications systems in the embodiments. The following uses examples of embodiments to describe an apparatus used in a scenario of moving between different communications systems.

Figure 7:
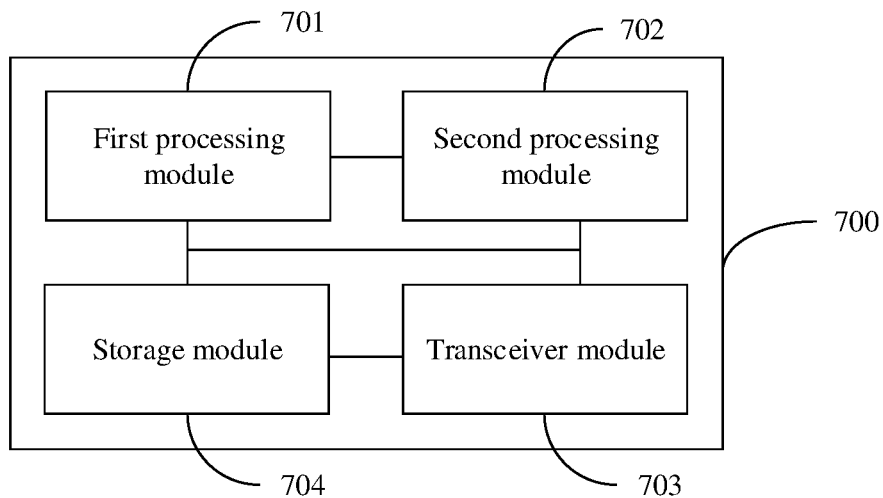
FIG. 7 is a schematic structural diagram of an apparatus used in a scenario of move between different communications systems according to an embodiment.

FIG. 7 is a schematic structural diagram of an apparatus used in a scenario of move between different communications systems according to an embodiment of this application. As shown in FIG. 7, this embodiment provides the apparatus 700 used in a scenario of move between different communications systems. The apparatus may be a terminal device, or may be a component (for example, an integrated circuit or a chip) of the terminal device. Alternatively, the apparatus may be another communications module, configured to implement the methods corresponding to the first node or the second node in the method embodiments. The apparatus 700 may include: a first processing module 701 and a second processing module 702. Optionally, the apparatus may further include a transceiver module 703 and a storage module 704.

In a possible embodiment, one or more modules in FIG. 7 may be implemented by one or more processors, may be implemented by one or more processors and memories, may be implemented by one or more processors and transceivers, or may be implemented by one or more processors, memories, and transceivers. This is not limited in this embodiment. The processor, the memory, and the transceiver may be separately disposed, or may be integrated together.

The apparatus has a function of implementing the terminal device described in the embodiments. For example, the apparatus includes modules, units, or means that are of the terminal device and that correspond to the steps performed by the terminal device described in the embodiments, and the functions, units, or means may be implemented by software, may be implemented by hardware, or may be implemented by hardware executing corresponding software, or may be implemented by a combination of software and hardware. For details, refer to corresponding descriptions in the foregoing corresponding method embodiments.

Optionally, the modules in the apparatus 700 in this embodiment may be configured to perform the method described in the embodiments shown in FIG. 2, FIG. 3A to FIG. 3D, FIG. 4, FIG. 5A and FIG. 5B, or FIG. 6 in the embodiments.

In a first possible implementation, the apparatus 700 used in a scenario of moving between different communications systems in this embodiment includes the first processing module 701 and the second processing module 702.

The first processing module 701 is configured to transmit data for a first application in a first communications system via a first protocol data unit PDU session, where the first PDU session does not support interworking between the first communications system and a second communications system. The second processing module 702 is configured to move, by the apparatus 700, from the first communications system to the second communications system. After the apparatus 700 moves from the second communications system back to the first communications system, the second processing module and/or the first processing module are/is configured to obtain a second PDU session based on at least first transmission information of the first application, where the first transmission information includes an identifier of the first application. The first processing module is further configured to transmit data for the first application in the first communications system via the second PDU session.

Optionally, the first transmission information further includes a context of the first PDU session, and that the second processing module 702 is configured to obtain a second PDU session based on at least first transmission information of the first application includes: the second processing module 702 is configured to establish the second PDU session based on the context of the first PDU session.

Optionally, that the second processing module 702 and the first processing module 701 are configured to obtain a second PDU session based on at least first transmission information of the first application includes: the first processing module 701 is configured to obtain, based on the identifier of the first application, parameter information used to establish a PDU session corresponding to the first application; and the second processing module 702 is configured to establish the second PDU session based on the parameter information used to establish the PDU session corresponding to the first application.

Optionally, that the second processing module 702 and the first processing module 701 are configured to obtain a second PDU session based on at least first transmission information of the first application includes: the first processing module 701 is configured to obtain, based on the identifier of the first application, parameter information used to establish a PDU session corresponding to the first application; and if the apparatus 700 has no third PDU session in the first communications system, and parameter information in a context of the third PDU session includes at least some of the parameter information used to establish the PDU session corresponding to the first application, the second processing module 702 is configured to establish the second PDU session in the first communications system based on the parameter information used to establish the PDU session corresponding to the first application; or if the apparatus 700 has the third PDU session in the first communications system, the third PDU session is the second PDU session.

Optionally, the apparatus 700 further includes the second processing module 702. If the apparatus 700 starts a second application in the second communications system, and a PDN connection that is used to transmit data for the second application in the second communications system does not support interworking between the first communications system and the second communications system, after the apparatus 700 moves from the second communications system back to the first communications system, the first processing module 701 is further configured to obtain, based on an identifier of the second application, parameter information used to establish a PDU session corresponding to the second application; and if the apparatus 700 has no fourth PDU session in the first communications system, and parameter information in a context of the fourth PDU session includes at least some of the parameter information used to establish the PDU session corresponding to the second application, the second processing module 702 is further configured to establish a fifth PDU session in the first communications system based on the parameter information used to establish the PDU session corresponding to the second application, and the first processing module 701 is further configured to transmit data for the second application via the fifth PDU session; or if the apparatus 700 has the fourth PDU session in the first communications system, the first processing module 701 is further configured to transmit data for the second application in the first communications system via the fourth PDU session.

Optionally, the first transmission information further includes a data network name DNN used by the first PDU session, and after the apparatus 700 moves from the first communications system to the second communications system, when the apparatus 700 has a target PDN connection in the second communications system, the first processing module 701 is further configured to transmit data for the first PDU session in the second communications system via the target PDN connection, where the target PDN connection is a PDN connection that uses a target access point name APN, and the target APN is an APN that is in the second communications system and that is corresponding to the DNN used by the first PDU session.

Optionally, the first transmission information includes the context of the first PDU session, and after the apparatus 700 moves from the first communications system to the second communications system, the second processing module 702 is configured to establish a first PDN connection in the second communications system based on the context of the first PDU session; and the first processing module 701 is further configured to transmit data for the first PDU session in the second communications system via the first PDN connection.

Optionally, the context of the first PDU session includes a DNN used by the first PDU session; and before the second processing module 702 is configured to establish the first PDN connection in the second communications system based on the context of the first PDU session, the first processing module 701 is further configured to determine that the apparatus 700 has no PDN connection that uses a target APN in the second communications system, where the target APN is an APN that is in the second communications system and that is corresponding to the DNN used by the first PDU session.

Optionally, the first processing module 701 is further configured to store the first transmission information when the first PDU session does not support interworking between the first communications system and the second communications system.

Optionally, the first transmission information includes the context of the first PDU session.

Optionally, the first communications system is a 5G communications system, and the second communications system is a 4G communications system.

It should be noted that the apparatus 700 in this implementation may be a terminal, or may be a chip used in the terminal, or another combined device or component that has a function of the terminal. When the apparatus 700 is the terminal or the component that has the function of the terminal, the first processing module may be an application processor, and the second processing module may be a modem. When the apparatus 700 is a chip system, the first processing module may be an application processor in the chip system, and the second processing module may be a modem in the chip system.

The apparatus used in a scenario of moving between different communications systems in this implementation may be configured to execute the solutions in the foregoing method embodiments. Implementation principles and effects thereof are similar, and details are not described herein again.

In a second possible implementation, the apparatus 700 used in a scenario of move between different communications systems in this embodiment includes the first processing module 701 and the second processing module 702.

The first processing module 701 is configured to transmit data for a first application in a 4G communications system via a first PDN connection, where the first PDN connection does not support interworking between the 4G communications system and a 5G communications system. After the apparatus moves from the 4G communications system to the 5G communications system, the first processing module 701 and/or the second processing module 702 are/is configured to obtain a first PDU session based on at least first transmission information of the first application. The first processing module 701 is further configured to transmit data for the first application in the 5G communications system via the first PDU session, where the first transmission information includes an identifier of the first application.

Optionally, that the first processing module 701 and the second processing module 702 are configured to obtain a first PDU session based on at least first transmission information of the first application includes: the first processing module 701 is configured to obtain, based on the identifier of the first application, parameter information used to establish a PDU session corresponding to the first application; and the second processing module 702 is configured to establish the first PDU session in the 5G communications system based on the parameter information used to establish the PDU session corresponding to the first application.

Optionally, that the first processing module 701 and the second processing module 702 are configured to obtain a first PDU session based on at least first transmission information of the first application includes: the first processing module 701 is configured to obtain, based on the identifier of the first application, parameter information used to establish a PDU session corresponding to the first application; and if the apparatus has no second PDU session in the 5G communications system, and parameter information in a context of the second PDU session includes at least some of the parameter information used to establish the PDU session corresponding to the first application, the second processing module 702 is configured to establish the first PDU session in the 5G communications system based on the parameter information used to establish the PDU session corresponding to the first application; or if the apparatus has the second PDU session in the 5G communications system, the second PDU session is the first PDU session.

Optionally, the first processing module 701 is further configured to store the first transmission information when the first PDN connection does not support interworking between the first communications system and the second communications system.

It should be noted that the apparatus in this implementation may be a terminal, or may be a chip used in the terminal, or another combined device or component that has a function of the terminal. When the apparatus is the terminal or the component that has the function of the terminal, the first processing module may be an application processor, and the second processing module may be a modem. When the apparatus is a chip system, the first processing module may be an application processor in the chip system, and the second processing module may be a modem in the chip system.

The apparatus used in a scenario of move between different communications systems in this implementation may be configured to execute the solutions in the foregoing method embodiments. Implementation principles and effects thereof are similar, and details are not described herein again.

It should be noted that, in the embodiments, division into the modules is an example, and is merely logical function division. In an actual implementation, another division manner may be used. Function modules in the embodiments may be integrated into one processing module, or each of the modules may exist alone physically, or two or more modules are integrated into one module. The integrated module may be implemented in a form of hardware or may be implemented in a form of a software function module.

When the integrated module is implemented in the form of a software function module and sold or used as an independent product, the integrated unit may be stored in a computer-readable storage medium. Based on such an understanding, the solutions essentially, or all or some of the solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments. The foregoing storage medium includes any medium that can store program code, for example, a USB flash drive, a removable hard disk, a read-only memory (ROM), a random access memory (RAM), a magnetic disk, or an optical disc.

Figure 8:
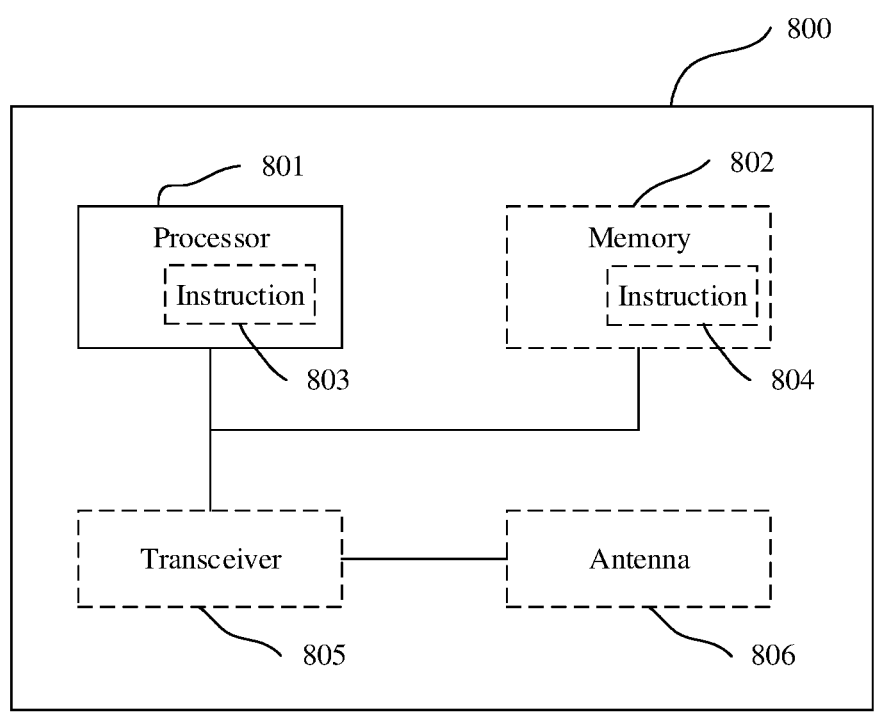
FIG. 8 is a schematic structural diagram of an apparatus used in a scenario of move between different communications systems according to another embodiment.

FIG. 8 is a schematic structural diagram of an apparatus used in a scenario of move between different communications systems according to another embodiment. Referring to FIG. 8, the apparatus 800 used in a scenario of move between different communications systems may be a terminal device, or may be a chip, a chip system, a processor, or the like that supports the terminal device in implementing the foregoing method, or may be a chip, a chip system, a processor, or the like that supports implementation of the foregoing methods. The apparatus 800 may be configured to implement the method described in the foregoing method embodiments. For details, refer to the descriptions in the foregoing method embodiments.

The apparatus 800 may include one or more processors. The processor 801 may alternatively be referred to as a processing unit and may implement a control function. The processor 801 may be a general-purpose processor, a special-purpose processor, or the like, for example, may be a modem or an application processor. The modem may be configured to process a communications protocol and communications data. The application processor may be configured to control the apparatus 800 (for example, a base station, a baseband chip, a terminal, a terminal a chip, a DU, or a CU), execute a software program, and process data of the software program.

In an optional implementation, the processor 801 may also store an instruction and/or data 803. The instruction and/or data 803 may be run by the processor, so that the apparatus 800 performs the methods described in the foregoing method embodiments.

In another optional embodiment, the processor 801 may include a transceiver unit configured to implement receiving and sending functions. For example, the transceiver unit may be a transceiver circuit, an interface, or an interface circuit. A transceiver circuit, an interface, or an interface circuit configured to implement the receiving and sending functions may be separated, or may be integrated together. The transceiver circuit, the interface, or the interface circuit may be configured to read and write code/data; or the transceiver circuit, the interface, or the interface circuit may be configured to transmit or transfer a signal.

In another possible embodiment, the apparatus 800 may include a circuit. The circuit may implement the sending, receiving, or communication function in the foregoing method embodiments.

Optionally, the apparatus 800 may include one or more memories 802. The memory stores an instruction 804, and the instruction may be run on the processor, so that the apparatus 800 performs the method described in the foregoing embodiments. Optionally, the memory may further store data. Optionally, the processor may further store an instruction and/or data. The processor and the memory may be separately disposed, or may be integrated together. For example, correspondences described in the foregoing method embodiments may be stored in the memory or may be stored in the processor.

Optionally, the apparatus 800 may further include a transceiver 805 and/or an antenna 806. The processor 801 may be referred to as a processing unit and controls the apparatus 800. The transceiver 805 may be referred to as a transceiver unit, a transceiver machine, a transceiver circuit, a transceiver, or the like, and is configured to implement receiving and sending functions.

The processor and the transceiver may be implemented on an integrated circuit (IC), an analog IC, a radio frequency integrated circuit RFIC, a hybrid signal IC, an application specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The apparatus used in a scenario of moving between different communications systems described in the foregoing embodiments may be a terminal device. However, a scope of the apparatus used in a scenario of moving between different communications systems is not limited thereto. In addition, a structure of the apparatus used in a scenario of moving between different communications systems may not be limited by FIG. 8. The apparatus used in a scenario of moving between different communications systems may be an independent device or may be a part of a device. For example, the apparatus used in a scenario of move between different communications systems may be one or a combination of the following:

(1) an independent integrated circuit IC, a chip, a chip system, or a subsystem;
(2) a set including one or more ICs, where optionally, the IC set may further include a storage component configured to store data and/or an instruction;
(3) an ASIC, for example, a modem (MSM);
(4) a module that can be embedded in another device;
(5) a receiver, a terminal, an intelligent terminal, a cellular phone, a wireless device, a handheld phone, a mobile unit, a vehicle-mounted device, a network device, a cloud device, an artificial intelligence device, or the like; and
(6) other devices.

Figure 9:
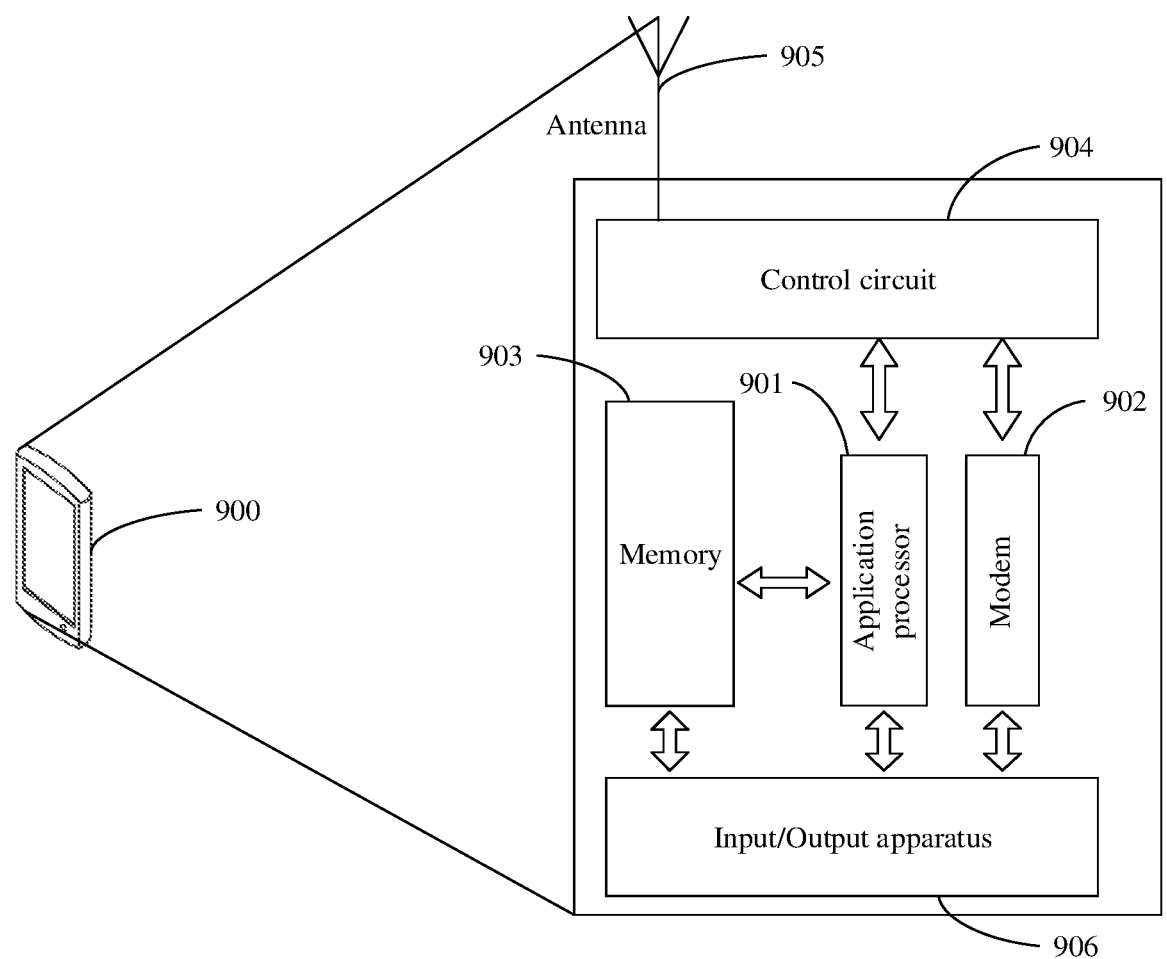
FIG. 9 is a schematic structural diagram of a terminal according to an embodiment.

FIG. 9 is a schematic structural diagram of a terminal according to an embodiment. The terminal is applicable to the terminal described in the foregoing embodiments. For ease of description, FIG. 9 shows only main components of the terminal. As shown in FIG. 9, the terminal 900 includes an application processor 901, a modem 902, a memory 903, a control circuit 904, an antenna 905, and an input/output apparatus 906 (for a communication connection between the modem and the memory, the connection between the modem and the memory is not shown in FIG. 9 for clarity of the accompanying drawings). The modem 902 is mainly configured to process a communications protocol and communication data. The application processor 901 is mainly configured to control the entire terminal, execute a software program, and process data of the software program. The memory 903 is mainly configured to store the software program and the data. The control circuit 904 is mainly configured to perform conversion between a baseband signal and a radio frequency signal and process the radio frequency signal. The antenna 905 is mainly configured to receive and send a radio frequency signal in a form of an electromagnetic wave. The input/output apparatus 906 such as a touchscreen, a display, or a keyboard is mainly configured to: receive data entered by a user, and output data to the user.

After the terminal is powered on, the application processor 901 may read a software program in a storage unit, interpret and execute an instruction of the software program, and process data of the software program. When data needs to be sent through radio, the modem 902 performs baseband processing on the to-be-sent data, and outputs a baseband signal to the radio frequency circuit. After performing radio frequency processing on the baseband signal, the control circuit 904 sends a radio frequency signal in an electromagnetic wave form through the antenna. When data is sent to the terminal, the control circuit 904 receives a radio frequency signal through the antenna, converts the radio frequency signal into a baseband signal, and outputs the baseband signal to the modem 902, and the modem 902 converts the baseband signal into data, and processes the data.

A person of ordinary skill in the art may understand that for ease of description, FIG. 9 shows only one memory. In an actual terminal, there may be a plurality of memories 903. The memory may alternatively be referred to as a storage medium, a storage device, or the like. This is not limited in the embodiments.

A person of ordinary skill in the art may understand that the terminal may include a plurality of modems 902 to adapt to different network standards, and the terminal may include a plurality of application processors 901 to enhance a processing capability of the terminal. The components in the terminal may be connected through various buses. The modem 902 may also be expressed as a baseband processing circuit or a baseband processing chip. The application processor 901 may also be expressed as a central processing circuit, a central processing chip, or a central processing unit. A function of processing the communication protocol and the communication data may be built in the modem 902, or may be stored in the storage unit in a form of a software program. The modem 902 executes the software program to implement a baseband processing function.

As an optional implementation, the modem 902 and the application processor 901 may alternatively be integrated together.

In a first possible implementation, the terminal in this embodiment may include the application processor 901 and the modem 902.

The application processor 901 is configured to transmit data for a first application in a first communications system via a first protocol data unit PDU session, where the first PDU session does not support interworking between the first communications system and a second communications system. The modem 902 is configured to move, by the terminal, from the first communications system to the second communications system. After the terminal moves from the second communications system back to the first communications system, the modem 902 and/or the application processor 901 are/is configured to obtain a second PDU session based on at least first transmission information of the first application, where the first transmission information includes an identifier of the first application. The application processor 901 is further configured to transmit data for the first application in the first communications system via the second PDU session.

Optionally, the first transmission information further includes a context of the first PDU session, and that the modem 902 is configured to obtain a second PDU session based on at least first transmission information of the first application includes: the modem 902 is configured to establish the second PDU session based on the context of the first PDU session.

Optionally, that the modem 902 and the application processor 901 are configured to obtain a second PDU session based on at least first transmission information of the first application includes: the application processor 901 is configured to obtain, based on the identifier of the first application, parameter information used to establish a PDU session corresponding to the first application; and the modem 902 is configured to establish the second PDU session based on the parameter information used to establish the PDU session corresponding to the first application.

Optionally, that the modem 902 and the application processor 901 are configured to obtain a second PDU session based on at least first transmission information of the first application includes: the application processor 901 is configured to obtain, based on the identifier of the first application, parameter information used to establish a PDU session corresponding to the first application; and if the terminal has no third PDU session in the first communications system, and parameter information in a context of the third PDU session includes at least some of the parameter information used to establish the PDU session corresponding to the first application, the modem 902 is configured to establish the second PDU session in the first communications system based on the parameter information used to establish the PDU session corresponding to the first application; or if the terminal has the third PDU session in the first communications system, the third PDU session is the second PDU session.

Optionally, the terminal father includes the modem 902. If the terminal starts a second application in the second communications system, and a PDN connection that is used to transmit data for the second application in the second communications system does not support interworking between the first communications system and the second communications system, after the terminal moves from the second communications system back to the first communications system, the application processor 901 is further configured to obtain, based on an identifier of the second application, parameter information used to establish a PDU session corresponding to the second application; and if the terminal has no fourth PDU session in the first communications system, and parameter information in a context of the fourth PDU session includes at least some of the parameter information used to establish the PDU session corresponding to the second application, the modem 902 is configured to establish a fifth PDU session in the first communications system based on the parameter information used to establish the PDU session corresponding to the second application, and the application processor 901 is further configured to transmit data for the second application via the fifth PDU session; or if the terminal has the fourth PDU session in the first communications system, the application processor 901 is further configured to transmit data for the second application in the first communications system via the fourth PDU session.

Optionally, the first transmission information further includes a DNN used by the first PDU session, and after the terminal moves from the first communications system to the second communications system, when the terminal has a target PDN connection in the second communications system, the application processor 901 is further configured to transmit data for the first PDU session in the second communications system via the target PDN connection, where the target PDN connection is a PDN connection that uses a target APN, and the target APN is an APN that is in the second communications system and that is corresponding to the DNN used by the first PDU session.

Optionally, the first transmission information includes the context of the first PDU session, and after the terminal moves from the first communications system to the second communications system, the modem 902 is configured to establish a first PDN connection in the second communications system based on the context of the first PDU session; and the application processor 901 is further configured to transmit data for the first PDU session in the second communications system via the first PDN connection.

Optionally, the context of the first PDU session includes a DNN used by the first PDU session; and before the modem 902 is configured to establish the first PDN connection in the second communications system based on the context of the first PDU session, the application processor 901 is further configured to determine that the terminal has no PDN connection that uses a target APN in the second communications system, where the target APN is an APN that is in the second communications system and that is corresponding to the DNN used by the first PDU session.

Optionally, the application processor 901 is further configured to store the first transmission information when the first PDU session does not support interworking between the first communications system and the second communications system.

Optionally, the first transmission information includes the context of the first PDU session.

Optionally, the first communications system is a 5G communications system, and the second communications system is a 4G communications system.

In a second possible implementation, the terminal in this embodiment may include the application processor 901 and the modem 902.

The application processor 901 is configured to transmit data for a first application in a 4G communications system via a first PDN connection, where the first PDN connection does not support interworking between the 4G communications system and a 5G communications system. After the terminal moves from the 4G communications system to the 5G communications system, the application processor 901 and/or the modem 902 are/is configured to obtain a first PDU session based on at least first transmission information of the first application. The application processor 901 is further configured to transmit data for the first application in the 5G communications system via the first PDU session, where the first transmission information includes an identifier of the first application.

Optionally, that the application processor 901 and the modem 902 are configured to obtain a first PDU session based on at least first transmission information of the first application includes: the application processor 901 is configured to obtain, based on the identifier of the first application, parameter information used to establish a PDU session corresponding to the first application; and the modem 902 is configured to establish the first PDU session in the 5G communications system based on the parameter information used to establish the PDU session corresponding to the first application.

Optionally, that the application processor 901 and the modem 902 are configured to obtain a first PDU session based on at least first transmission information of the first application includes: the application processor 901 is configured to obtain, based on the identifier of the first application, parameter information used to establish a PDU session corresponding to the first application; and if the terminal has no second PDU session in the 5G communications system, and parameter information in a context of the second PDU session includes at least some of the parameter information used to establish the PDU session corresponding to the first application, the modem 902 is configured to establish the first PDU session in the 5G communications system based on the parameter information used to establish the PDU session corresponding to the first application; or if the terminal has the second PDU session in the 5G communications system, the second PDU session is the first PDU session.

Optionally, the application processor 901 is further configured to store the first transmission information when the first PDN connection does not support interworking between the first communications system and the second communications system.

An embodiment further provides a readable storage medium. The readable storage medium stores a computer program. When the computer program is executed, the communication method used in a scenario of move between different communications systems in the foregoing method embodiments is implemented.

It should be understood that the application processor 901 or the modem 902 in this embodiment may be an integrated circuit chip and has a signal processing capability. The application processor 901 and the modem 902 may alternatively be integrated together, for example, integrated on a system on chip (SoC).

The apparatus used in a scenario of move between different communications systems described in the embodiments may be a terminal, or is a part of the terminal, for example, a system chip on the terminal. In an implementation process, the steps in the foregoing method embodiments may be implemented by using a hardware integrated logic circuit in the processor or instructions in a form of software. The foregoing processor may be a general-purpose processor, a digital signal processor (DSP), an ASIC, a field programmable gate array (FPGA) or another programmable logic device, a discrete gate or transistor logic device, or a discrete hardware component.

It may be understood that the memory in the embodiments may be a volatile memory or a non-volatile memory or may include both a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM that is used as an external cache. Through example descriptions rather than limitative descriptions, RAMs in many forms may be used, for example, a static random access memory (SRAM), a dynamic random access memory (dynamic RAM, DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described include but are not limited to these memories and any memory of another proper type.

The embodiments further provide a computer-readable medium. The computer-readable medium stores a computer program. When the computer program is executed by a computer, a function in any one of the foregoing method embodiments is implemented.

The embodiments further provide a computer program product. When the computer program product is executed by a computer, a function in any one of the foregoing method embodiments is implemented.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer instructions are loaded and executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that an "embodiment" means that particular characteristics, structures, or features related to the embodiment are included in at least one embodiment. Therefore, the embodiments do not necessarily refer to a same embodiment. In addition, these particular characteristics, structures, or features may be combined in one or more embodiments in any appropriate manner. It should be understood that sequence numbers of the foregoing processes do not mean execution sequences in the embodiments. The execution sequences of the processes should be determined according to functions and internal logic of the processes, and should not be construed as any limitation on the implementation processes of the embodiments.

It should be further understood that "when" and "if" mean that UE or a base station performs corresponding processing in an objective situation, and are not intended to limit time, and the UE or the base station is not necessarily required to have a determining action during implementation, and do not mean any other limitation.

Unless otherwise specified, an element represented in a singular form is intended to represent "one or more", but is not intended to represent "one and only one". Unless otherwise specified, "at least one" represents "one or more", and "a plurality of" represents "two or more".

In addition, the terms "system" and "network" may be used interchangeably. The term "and/or" describes only an association relationship for describing associated objects and represents that three relationships may exist. For example, A and/or B may represent the following three cases: only A exists, both A and B exist, and only B exists. A may be singular or plural, and B may be singular or plural.

The character "/" generally represents an "or" relationship between the associated objects.

The term "at least one of . . . " or "at least one type of . . . " represents all or any combination of the listed items. For example, "at least one of A, B, and C" may represent the following six cases: Only A exists, only B exists, only C exists, both A and B exist, both B and C exist, and A, B and C all exist. A may be singular or plural, B may be singular or plural, and C may be singular or plural.

It should be understood that in the embodiments, "B corresponding to A" represents that B is associated with A, and B may be determined based on A. However, it should be further understood that determining B based on A does not mean that B is determined based on only A. B may alternatively be determined based on A and/or other information.

"Predefine" in this application may be understood as "define", "predefine", "store", "prestore", "pre-negotiate", "preconfigure", "solidify", or "pre-burn".

A person of ordinary skill in the art may be aware that units, algorithms, and steps in the examples described with reference to the embodiments can be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope of the embodiments.

It may be understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions in the embodiments.

In addition, the function units in the embodiments may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the solutions essentially, or the part contributing to the prior art, or some of the solutions may be implemented in a form of a software product. The computer software product is stored in a storage medium and includes several instructions for instructing a computer device (which may be a personal computer, a server, a network device, or the like) to perform all or some of the steps of the methods in the embodiments. The foregoing storage medium includes: any medium that can store program code, for example, a USB flash drive, a removable hard disk, a ROM, a RAM, a magnetic disk, or an optical disc.

The foregoing descriptions are merely exemplary implementations, but are not limiting.

What is claimed is:

1. A communication method used in a scenario of moving between different communications systems, comprising:
   transmitting, by a terminal, data for a first application in a first communications system via a first protocol data unit (PDU) session, wherein the first PDU session does not support interworking between the first communications system and a second communications system;
   moving, by the terminal, from the first communications system to the second communications system; and
   after the terminal moves from the second communications system back to the first communications system, obtaining, by the terminal, a second PDU session based on at least first transmission information of the first application, and transmitting data for the first application in the first communications system via the second PDU session, wherein the first transmission information comprises an identifier of the first application,
   wherein the obtaining, by the terminal, of the second PDU session based on at least first transmission information of the first application comprises:
   obtaining, by the terminal based on the identifier of the first application, parameter information used to establish a PDU session corresponding to the first application; and
   if the terminal has no third PDU session in the first communications system, and parameter information in a context of the third PDU session comprises at least some of the parameter information used to establish the PDU session corresponding to the first application, establishing, by the terminal, the second PDU session in the first communications system based on the parameter information used to establish the PDU session corresponding to the first application; or
   if the terminal has the third PDU session in the first communications system, the third PDU session is the second PDU session.

2. The method according to claim 1, wherein the first transmission information further comprises a context of the first PDU session, and the obtaining, by the terminal, of the second PDU session based on at least first transmission information of the first application comprises:
   establishing, by the terminal, the second PDU session in the first communications system based on the context of the first PDU session.

3. The method according to claim 1, wherein the obtaining, by the terminal, of the second PDU session based on at least first transmission information of the first application comprises:
   establishing, by the terminal, the second PDU session in the first communications system based on the parameter information used to establish the PDU session corresponding to the first application.

4. The method according to claim 1, wherein if the terminal starts a second application in the second communications system, and a public data network (PDN) connection that is used to transmit data for the second application in the second communications system does not support interworking between the first communications system and the second communications system, after the terminal moves from the second communications system back to the first communications system, the method further comprises:
obtaining, by the terminal based on an identifier of the second application, parameter information used to establish a PDU session corresponding to the second application; and
if the terminal has no fourth PDU session in the first communications system, and parameter information in a context of the fourth PDU session comprises at least some of the parameter information used to establish the PDU session corresponding to the second application, establishing, by the terminal, a fifth PDU session in the first communications system based on the parameter information used to establish the PDU session corresponding to the second application, and transmitting data for the second application via the fifth PDU session; or
if the terminal has the fourth PDU session in the first communications system, transmitting, by the terminal, data for the second application in the first communications system via the fourth PDU session.

5. The method according to claim 1, wherein the first transmission information further comprises a data network name (DNN) used by the first PDU session, and after the terminal moves from the first communications system to the second communications system, the method further comprises:
when a target public data network (PDN) connection exists in the second communications system, transmitting, by the terminal, data for the first PDU session in the second communications system via the target PDN connection, wherein the target PDN connection is a PDN connection that uses a target access point name (APN), and the target APN is an APN that is in the second communications system and that is corresponding to the DNN used by the first PDU session.

6. The method according to claim 1, wherein the first transmission information comprises the context of the first PDU session, and after the terminal moves from the first communications system to the second communications system, the method further comprises:
establishing, by the terminal, a first PDN connection in the second communications system based on the context of the first PDU session; and
transmitting, by the terminal, data for the first PDU session in the second communications system via the first PDN connection.

7. The method according to claim 6, wherein the context of the first PDU session comprises a data network name (DNN) used by the first PDU session; and
before the establishing, by the terminal, the first PDN connection in the second communications system based on the context of the first PDU session, the method further comprises:
determining, by the terminal, that no PDN connection that uses a target access point name (APN) exists in the second communications system, wherein the target APN is an APN that is in the second communications system and that is corresponding to the DNN used by the first PDU session.

8. The method according to claim 1, further comprising:
storing, by the terminal, the first transmission information when the first PDU session does not support interworking between the first communications system and the second communications system.

9. The method according to claim 8, wherein the first transmission information comprises the context of the first PDU session.

10. The method according to claim 1, wherein the first communications system is a fifth generation communications system, and the second communications system is a fourth generation communications system.

11. An apparatus used to move between different communications systems, comprising:
an application processor configured to transmit data for a first application in a first communications system by using a first protocol data unit (PDU) session, wherein the first PDU session does not support interworking between the first communications system and a second communications system; and
a modem configured to move, by the apparatus, from the first communications system to the second communications system, wherein
after the apparatus moves from the second communications system back to the first communications system, the modem and/or the application processor are configured to obtain a second PDU session based on at least first transmission information of the first application wherein the application processor is configured to obtain, based on the identifier of the first application, parameter information used to establish a PDU session corresponding to the first application, wherein the first transmission information comprises an identifier of the first application; and
the application processor is further configured to transmit data for the first application in the first communications system via the second PDU session, and
if the apparatus has no third PDU session in the first communications system, and parameter information in a context of the third PDU session comprises at least some of the parameter information used to establish the PDU session corresponding to the first application, the modem is configured to establish the second PDU session in the first communications system based on the parameter information used to establish the PDU session corresponding to the first application; or
if the apparatus has the third PDU session in the first communications system, the third PDU session is the second PDU session.

12. The apparatus according to claim 11, wherein the first transmission information further comprises a context of the first PDU session; and
that the modem is configured to obtain a second PDU session based on at least first transmission information of the first application comprises: the modem is configured to establish the second PDU session based on the context of the first PDU session.

13. The apparatus according to claim 11,
wherein
the modem is configured to establish the second PDU session based on the parameter information used to establish the PDU session corresponding to the first application.

14. The apparatus according to claim 11, wherein if the apparatus starts a second application in the second communications system, and a public data network (PDN) connection that is used to transmit data for the second application in the second communications system does not support interworking between the first communications system and the second communications system, after the apparatus moves from the second communications system back to the first communications system, the application processor is further configured to obtain, based on an identifier of the second application, parameter information used to establish a PDU session corresponding to the second application; and if the apparatus has no fourth PDU session in the first communications system, and parameter information in a context of the fourth PDU session comprises at least some of the parameter information used to establish the PDU session corresponding to the second application, the modem is further configured to establish a fifth PDU session in the first communications system based on the parameter information used to establish the PDU session corresponding to the second application, and the application processor is further configured to transmit data for the second application via the fifth PDU session; or if the apparatus has the fourth PDU session in the first communications system, the application processor is further configured to transmit data for the second application in the first communications system via the fourth PDU session.

15. The apparatus according to claim 11, wherein the first transmission information further comprises a data network name (DNN) used by the first PDU session, and after the apparatus moves from the first communications system to the second communications system, when the apparatus has a target public data network (PDN) connection in the second communications system, the application processor is further configured to transmit data for the first PDU session in the second communications system via the target PDN connection, wherein the target PDN connection is a PDN connection that uses a target access point name (APN), and the target APN is an APN that is in the second communications system and that is corresponding to the DNN used by the first PDU session.

16. The apparatus according to claim 11, wherein the first transmission information comprises the context of the first PDU session, and after the apparatus moves from the first communications system to the second communications system, the modem is configured to establish a first public data network (PDN) connection in the second communications system based on the context of the first PDU session; and the application processor is further configured to transmit data for the first PDU session in the second communications system via the first PDN connection.

17. The apparatus according to claim 16, wherein the context of the first PDU session comprises a data network name (DNN) used by the first PDU session; and before the modem is configured to establish the first PDN connection in the second communications system based on the context of the first PDU session, the application processor is further configured to determine that the apparatus has no PDN connection that uses a target access point name (APN) in the second communications system, wherein the target APN is an APN that is in the second communications system and that is corresponding to the DNN used by the first PDU session.

18. A computer readable storage medium, wherein the computer readable storage medium stores a computer program, and when the computer program is executed, the following method is implemented:

transmitting data for a first application in a first communications system via a first protocol data unit (PDU) session, wherein the first PDU session does not support interworking between the first communications system and a second communications system;

moving from the first communications system to the second communications system; and after moving from the second communications system back to the first communications system, obtaining a second PDU session based on at least first transmission information of the first application, and transmitting data for the first application in the first communications system via the second PDU session, wherein the first transmission information comprises an identifier of the first application, based on the identifier of the first application, obtaining parameter information used to establish the PDU session corresponding to the first application, when the second PDU session is obtained based on at least first transmission information of the first application:

obtaining, based on the identifier of the first application, parameter information used to establish a PDU session corresponding to the first application; and if the terminal has no third PDU session in the first communications system, and parameter information in a context of the third PDU session comprises at least some of the parameter information used to establish the PDU session corresponding to the first application, establishing the second PDU session in the first communications system based on the parameter information used to establish the PDU session corresponding to the first application; or if the terminal has the third PDU session in the first communications system, the third PDU session is the second PDU session.

* * * * *